United States Patent [19]
Ikeda et al.

[11] Patent Number: 5,270,807
[45] Date of Patent: Dec. 14, 1993

[54] COLOR IMAGE PROCESSING APPARATUS

[75] Inventors: Yoshinori Ikeda, Tokyo; Tetsuya Ohnishi; Masatomo Shimizu, both of Yokohama, all of Japan

[73] Assignee: Canon Kabushiki Kaisha, Tokyo, Japan

[21] Appl. No.: 842,058

[22] Filed: Feb. 26, 1992

Related U.S. Application Data

[60] Division of Ser. No. 752,981, Sep. 3, 1991, Pat. No. 5,119,187, which is a continuation of Ser. No. 654,030, Feb. 12, 1991, abandoned, which is a continuation of Ser. No. 327,098, Mar. 22, 1989, Pat. No. 5,047,844.

[30] Foreign Application Priority Data

Mar. 24, 1988 [JP] Japan .................................. 63-069979

[51] Int. Cl.$^5$ ............................................. H04N 1/46
[52] U.S. Cl. ..................................... 358/500; 358/527

[58] Field of Search ....................... 358/75, 80, 78, 79

[56] References Cited
U.S. PATENT DOCUMENTS
5,047,844 9/1991 Ikeda ........................................ 358/80

Primary Examiner—Howard W. Britton
Attorney, Agent, or Firm—Fitzpatrick, Cella, Harper & Scinto

[57] ABSTRACT

A color image processing apparatus is disclosed wherein an edge portion of an achromatic area is detected to emphasize the edge portion and reduce the density of a chromatic area near the edge portion, and the reduced chromatic portion signal is further suppressed, such that the half tone area can be processed at high gradation and the black character and line image can be outputted in more black and with high resolution, resulting in less color bleeding.

18 Claims, 26 Drawing Sheets

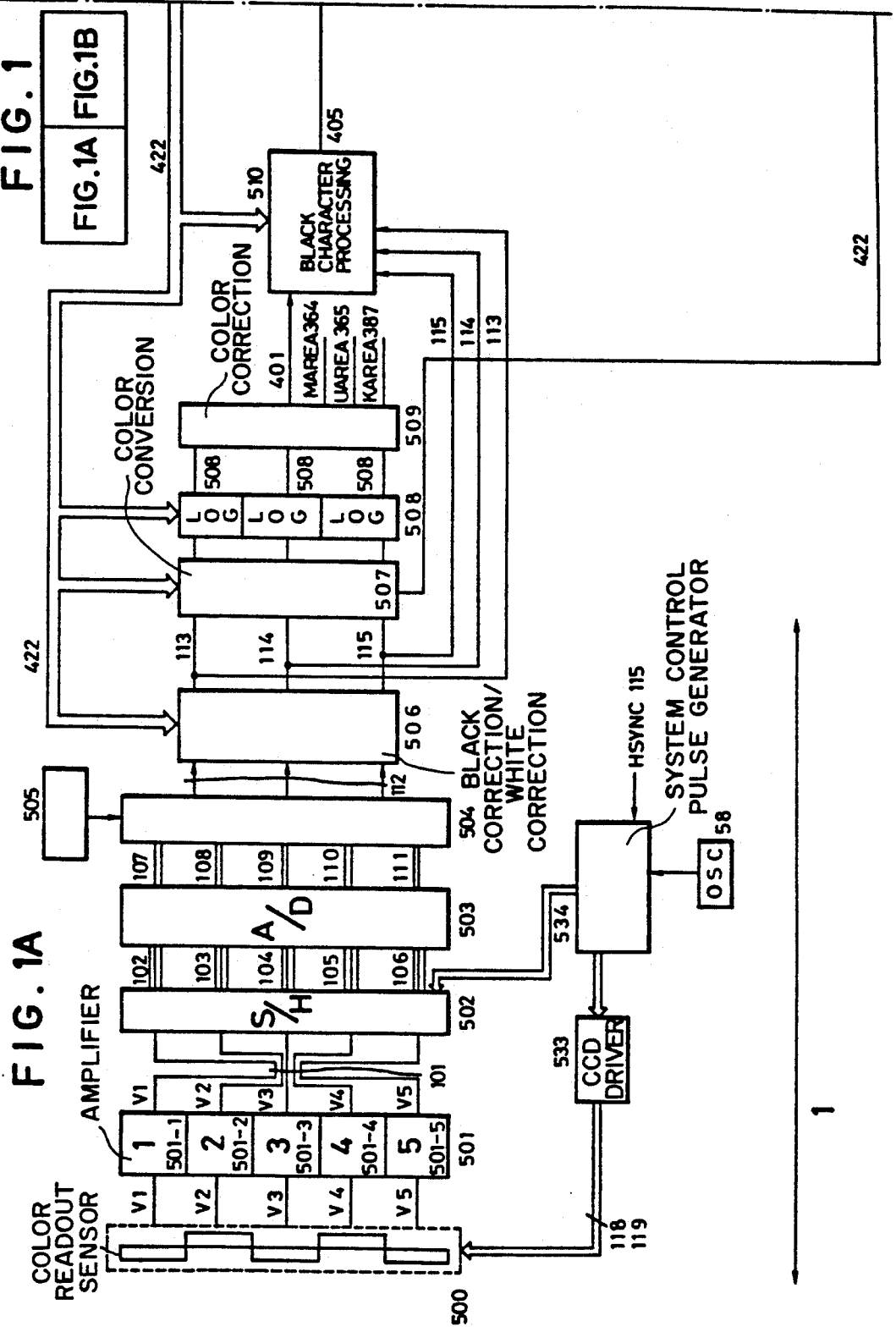

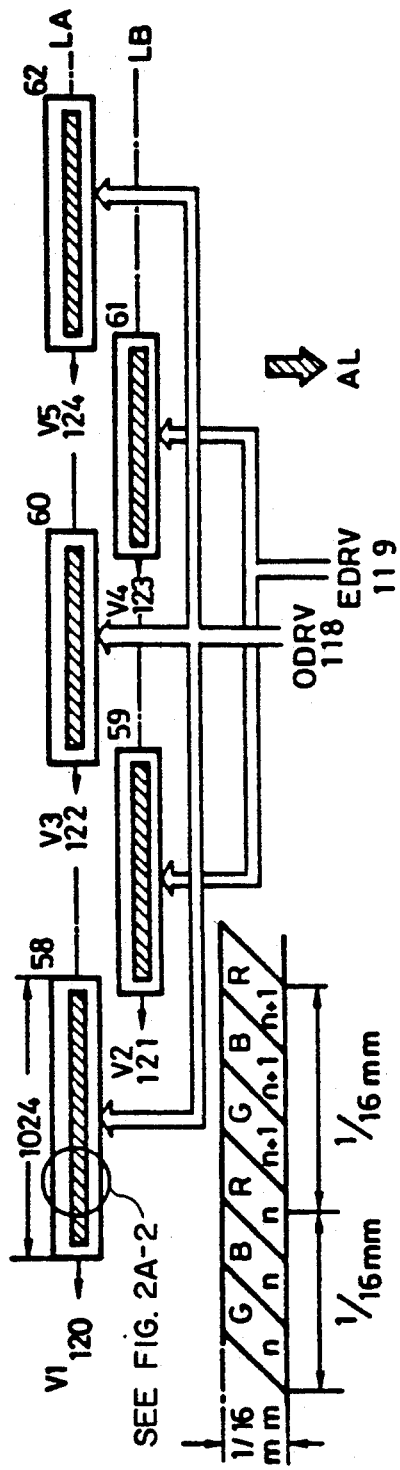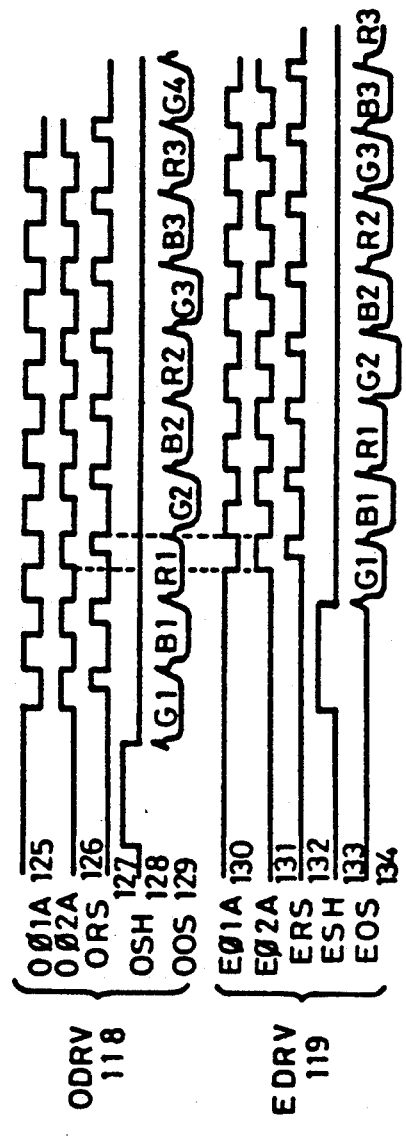

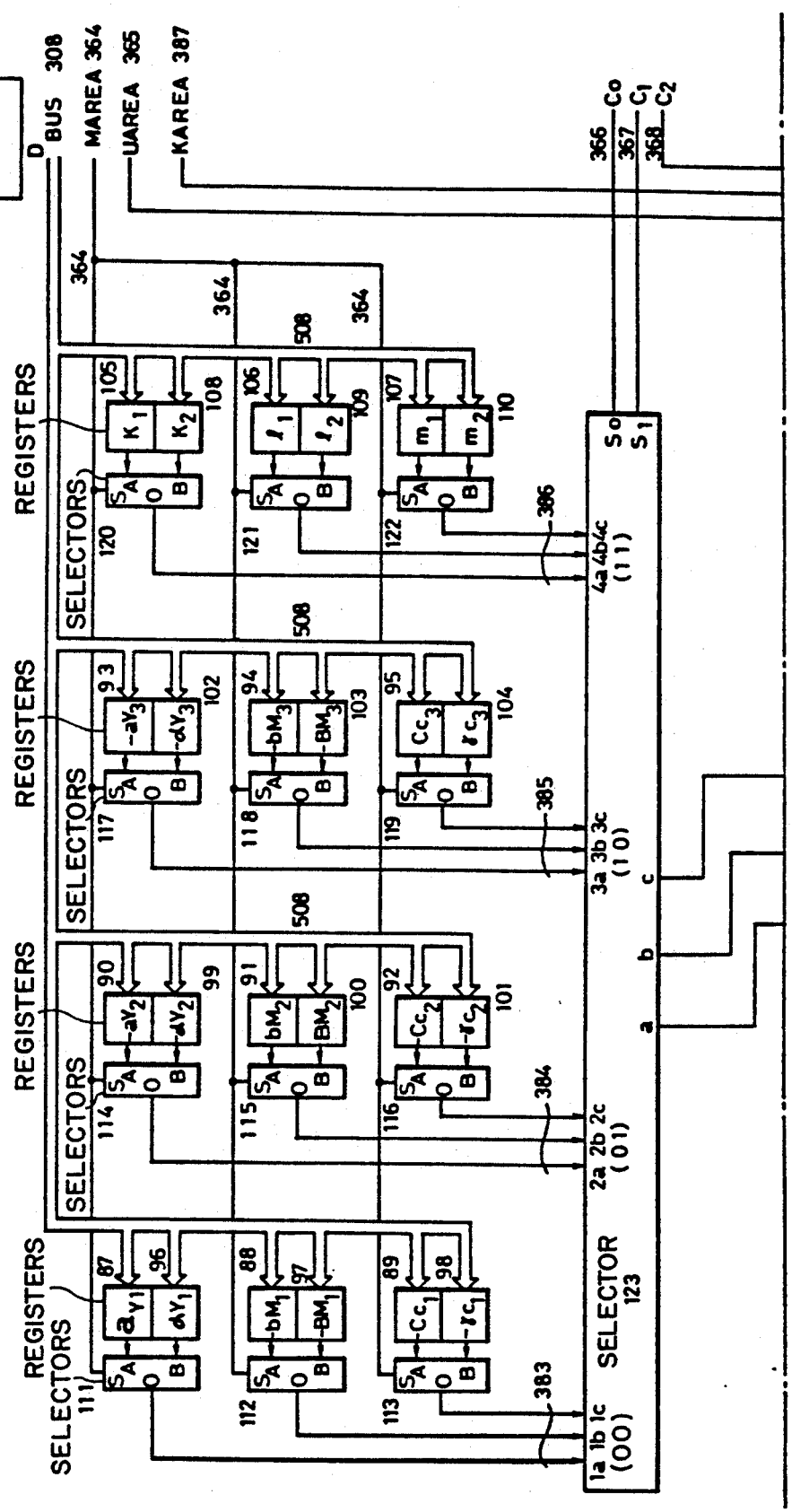

FIG.9B

| $C_2$ | $C_1$ | $C_0$ | a | b | c | | |
|---|---|---|---|---|---|---|---|
| 0 | 0 | 0 | 1a | 1b | 1c | Y | —① |
| 0 | 0 | 1 | 2a | 2b | 2c | M | —② |
| 0 | 1 | 0 | 3a | 3b | 3c | C | —③ |
| 0 | 1 | 1 | 4a | 4b | 4c | MONO | —④ |
| 1 | X | X | X | X | X | BK | —⑤ |

LUT (LOOK UP TABLE) A

LUT (LOOK UP TABLE) B

LUT (LOOK UP TABLE) C

F I G. 14B
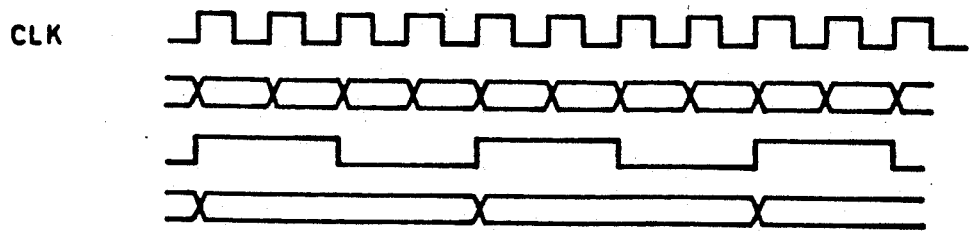
F I G. 14C
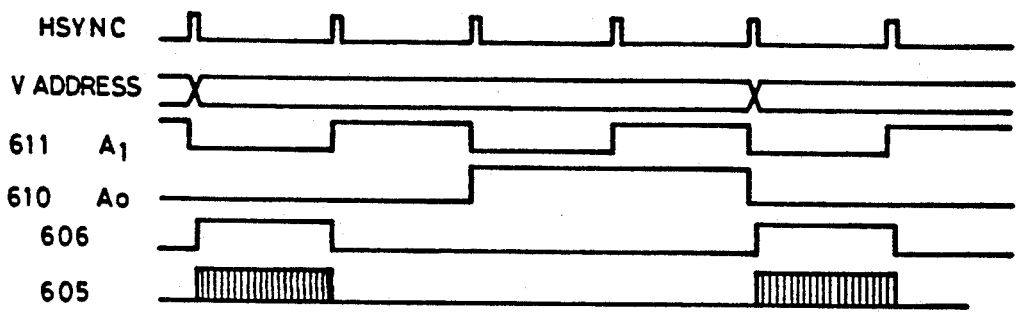
F I G. 14D
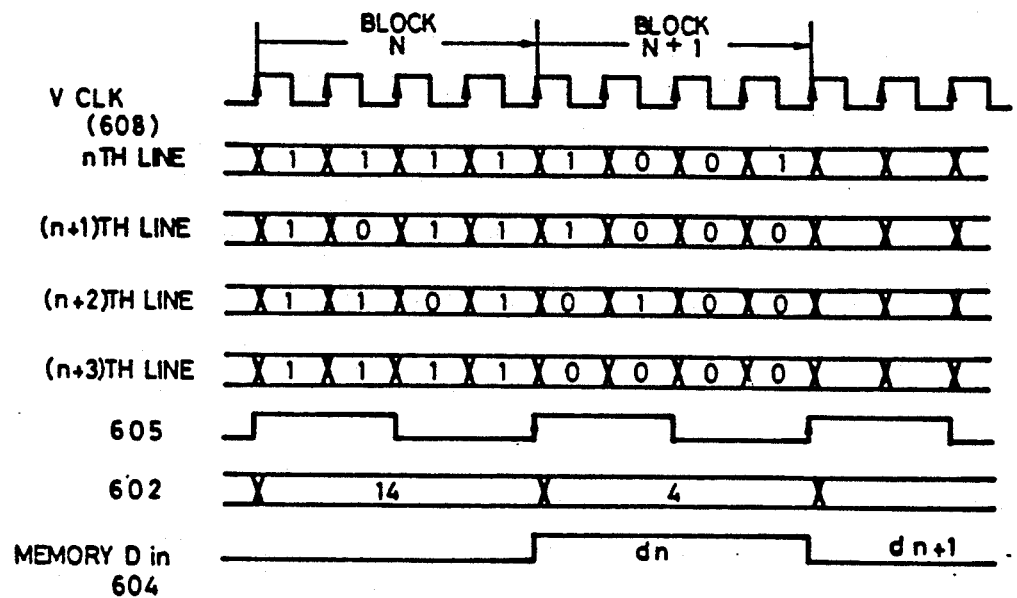

FIG. 17B(ii)

CUTTING OUT OPERATION

SYNTHESIZATION

FIG. 21A  FIG. 21B  FIG. 21C
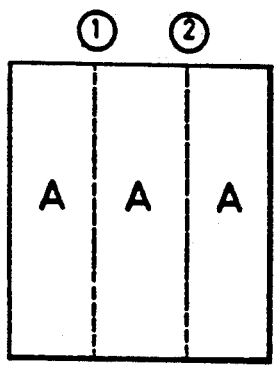
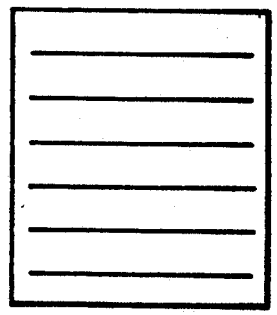
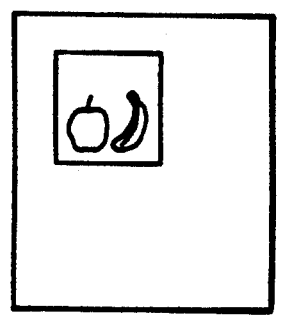
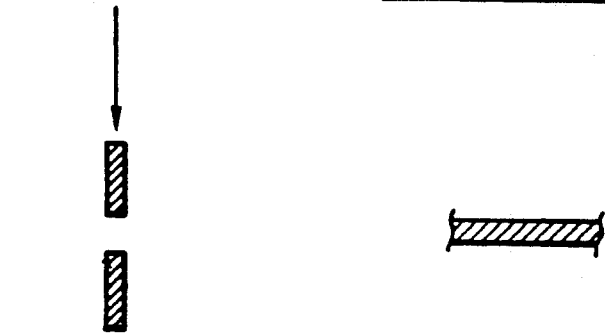
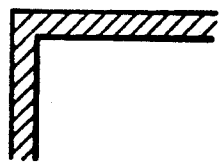

COLOR IMAGE PROCESSING APPARATUS

This application is a division of application Ser. No. 07/752,981 filed Sep. 3, 1991 now U.S. Pat. No. 5,119,187, which is a continuation of application Ser. No. 07/654,030 filed Feb. 12, 1991 now abandoned which is a continuation of application Ser. No. 07/327,098 filed Mar. 22, 1989, now U.S. Pat. No. 5,047,844.

BACKGROUND OF THE INVENTION

1. Field of the Invention

The present invention relates to a color image processing apparatus, and more particularly to an apparatus capable of reproducing a color image of high quality.

2. Related Background Art

Full color copying machines have been widely used in recent years. With such full color copying machines, a color original is digitally read through color separation to supply the obtained color data to a color printer mounted within the machine, whereat a full color copy of the original is printed using yellow, magenta, cyan and black four coloring materials.

There are many color originals which contain black character areas. It has been required for a half tone area within a color original to have multi-tones, and for a character and line image to have a high resolution.

There have been proposed various methods of completely separating a character and line image area and a half tone area which are subjected to proper signal processings to reproduce them with high fidelity.

However, in practice, it is difficult to completely separate only a black character signal and print it with only black coloring material. Therefore, black characters have been printed to some degree with other yellow, magenta, cyan coloring materials so that color bleeding occurs, resulting in poor quality of black characters and the like. The present applicant and same assignee have proposed U.S. Pat. No. 4,700,399 and U.S. application Ser. No. 173,654 to improve character quality, which are incorporated herein for reference.

SUMMARY OF THE INVENTION

In consideration of the above problems, it is an object of the present invention to provide an image processing apparatus capable of reproducing a color image while improving the reproduced image quality.

It is another object of the present invention to provide an image processing apparatus capable of processing a half tone area at high gradation, and outputting a black character and line image in more black and with high resolution.

According to a preferred embodiment of this invention seeking to achieve the above objects, there is disclosed a color image processing apparatus wherein an edge portion of an achromatic area is detected to emphasize the edge portion and reduce the density of a chromatic area near the edge portion, and the reduced chromatic portion signal is further suppressed, such that the half tone area can be processed at high gradation and the black character and line image can be outputted in more black and with high resolution, resulting in less color bleeding.

It is a further object of the present invention to provide a color image processing apparatus capable of preventing color bleeding to be caused by a readout error of a color readout system.

It is a still further object of the present invention to provide a color image processing apparatus having a novel function.

The other objects and advantages of the present invention will become apparent from the following description of the embodiments when read in conjunction with the accompanying drawings.

BRIEF DESCRIPTION OF THE DRAWINGS

FIGS. 1, 1A and 1B are a block diagram showing an embodiment of the color image processing apparatus according to the present invention;

FIGS. 2A-1, 2A-2 and 2B show a color readout sensor, and a timing chart of drive pulses, respectively;

FIGS. 4A, 4B1 and 4B-2 show a block diagram of a black correction circuit 506, and its explanatory view, respectively;

FIGS. 9A, 9A2, 9A2 and 9B show a block diagram of a masking and blacking UCR circuit, and its explanatory diagram, respectively;

FIGS. 14A to 14D show a block diagram of the peripheral circuit of a bit map memory for an area limit mask, and its explanatory views, respectively;

FIGS. 21A to 21C are explanatory views of the embodiment shown in FIG. 10.

DETAILED DESCRIPTION OF THE PREFERRED EMBODIMENTS

Figure 4A:
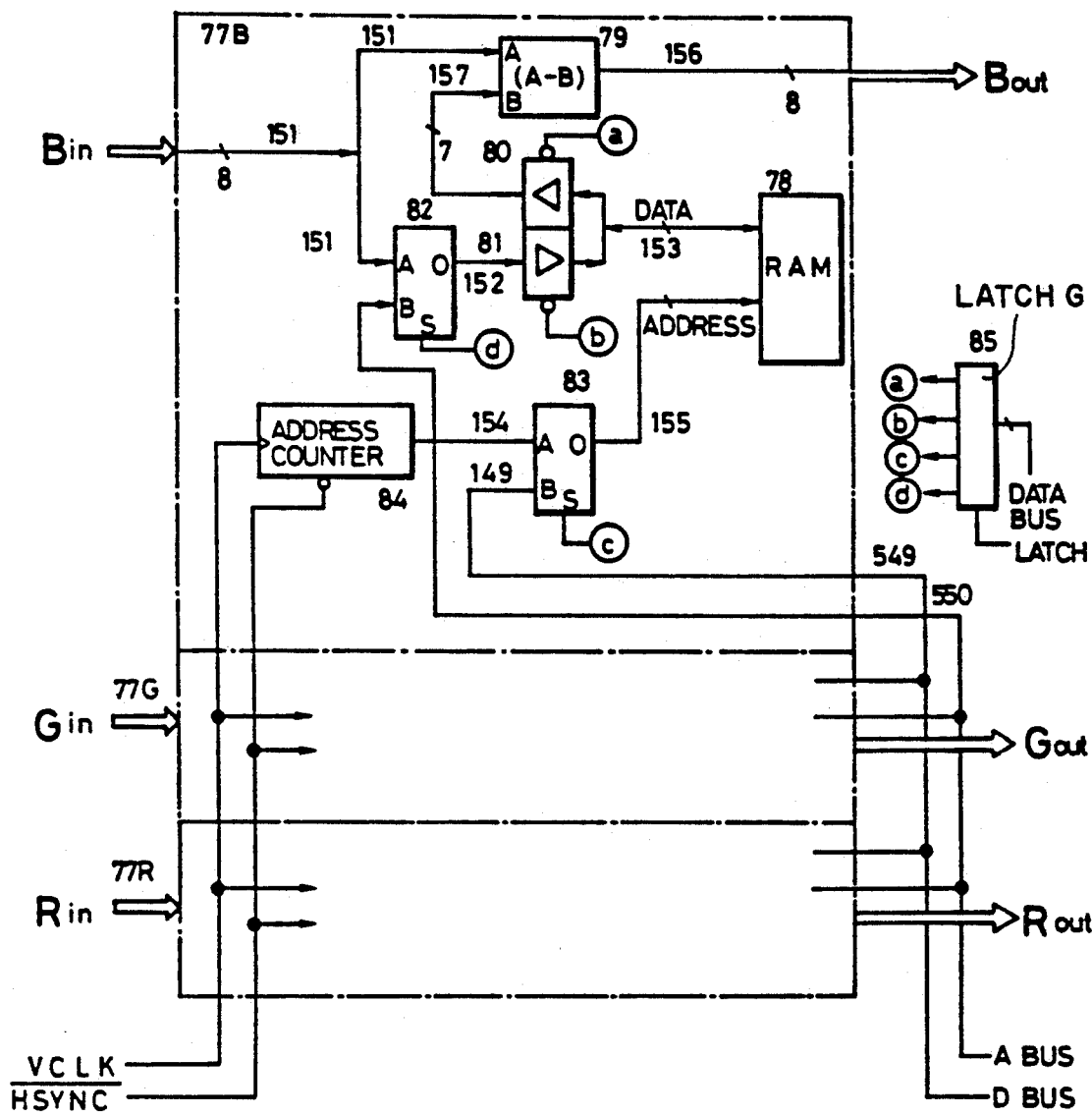
Figures 1, 4B:
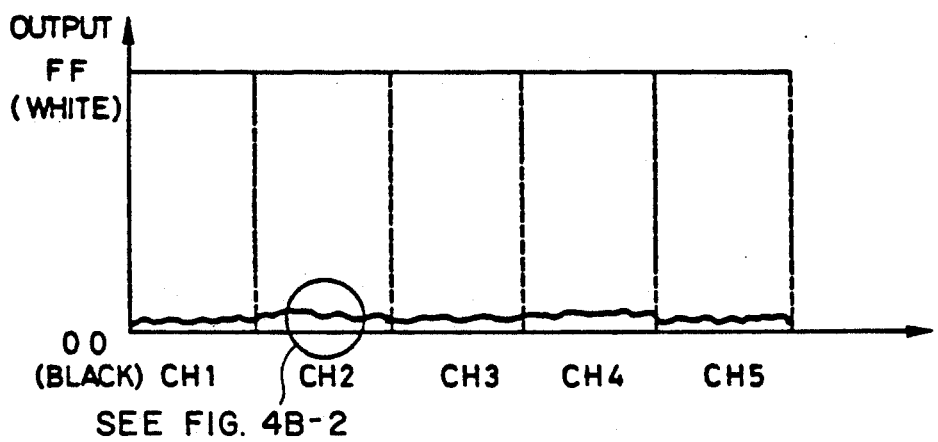

FIG. 1 is a block diagram of an embodiment of the color image processing apparatus according to the present invention.

An original is illuminated with an exposure lamp (not shown). A reflected light is read with a color readout sensor 500 for each pixel through color separation. The read-out signal is amplified by an amplifier 501 to a predetermined level. A system control pulse generator 534 generates system pulses. A CCD driver 533 supplies pulse signals to drive the color readout sensor 500.

Figures 2, 4B:
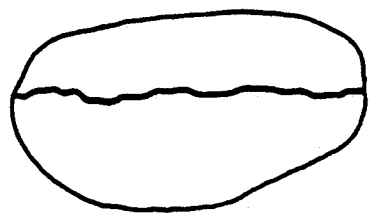

FIGS. 2A and 2B show a color readout sensor, and a timing chart of drive pulses.

Referring to FIG. 2A showing the color readout sensor used in this embodiment, the main scan direction is divided into five sections to read an original. One pixel has a length of 62.5 microns (1/16 mm) and divided into G (green), B (blue) and R (red) parts in the main scan direction, so that the total effective pixel number becomes 1024×3=3072. Chips 58 to 62 are mounted on a same ceramic substrate. The first, third and fifth sensors 58, 60 and 62 are aligned on a same line LA, and the second and fourth sensors 59 and 61 are aligned on a same line LB spaced apart from the line LA by four lines (i.e., 62.5 microns×4=250 microns). When reading an original, the sensors are scanned in the direction indicated by an arrow AL. The first, third, and fifth CCDs among the five CCDs are independently and synchronously driven by a drive pulse group ODRV 118, and the second and fourth CCDs, by EDRV 119. Signals 041A, 042A and ORS in ORDV 118 and signals E01A, E42A and ERS in EDRV 119 are charge transfer clocks and charge reset pulses, respectively. Both the signals are generated in synchro with each other without jitters so as to prevent mutual interference and noises among the first, third and fifth sensors, and among the second and fourth sensors. Therefore, these pulse signals are generated at a single reference oscillator OSC 58 (FIG. 1).

Figure 1B:
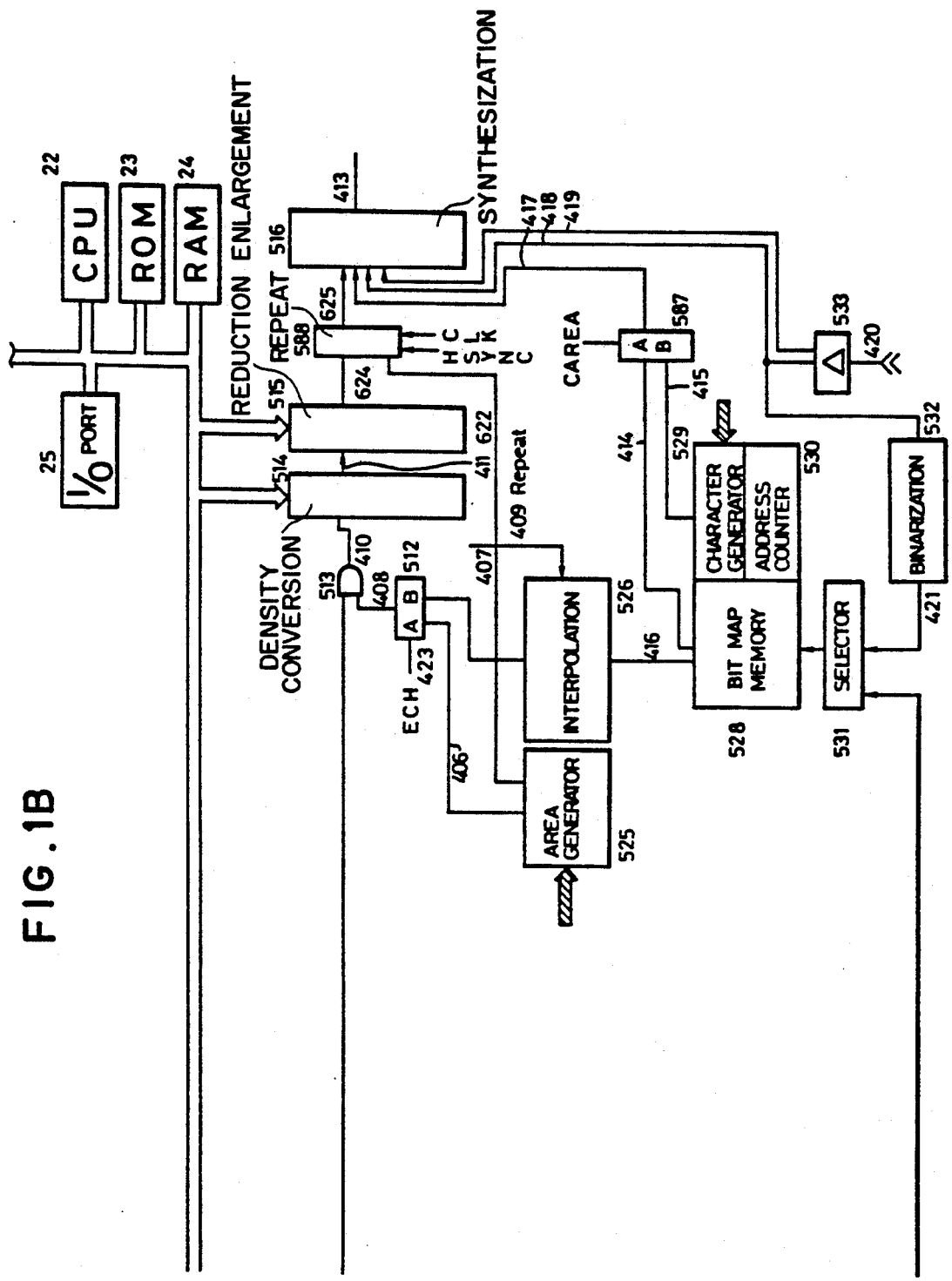
Figure 3A:
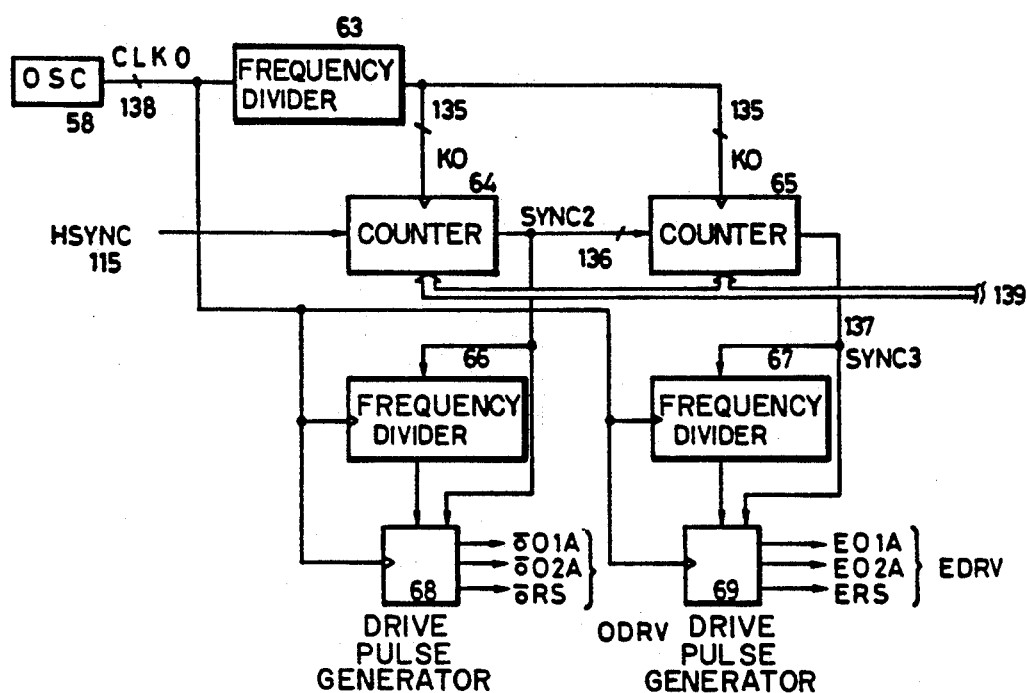
FIGS. 3A and 3B show a block diagram of the circuit for generating ODRV 118 and EDRV 119, and an associated timing chart, respectively.
Figure 3B:
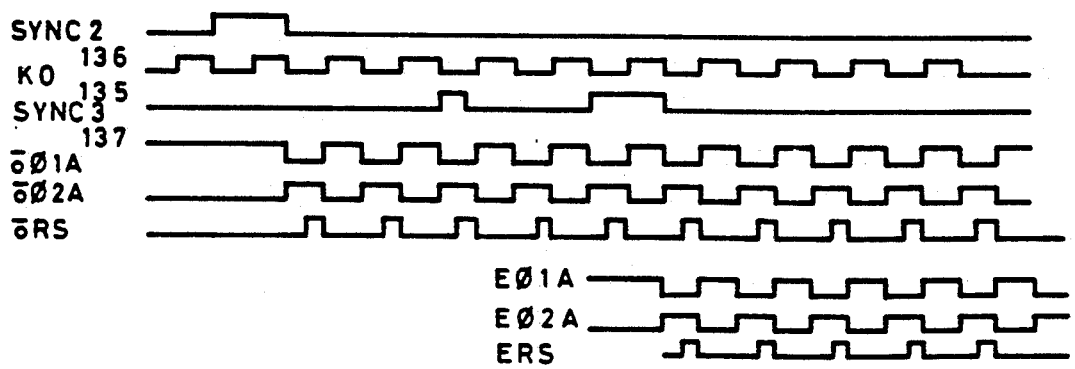

FIG. 3A is a block diagram showing a circuit for generating ODRV 118 and EDRV 119, FIG. 3B is a timing chart. The circuit is included within the system control pulse generator 534.

A single oscillator OSC 58' generates master clocks CLK 0 which is frequency divided to obtain clocks K0135. Clocks K0135 are used for generating reference signals SYNC 2 and SYNC 3 which determine the timings of generating ODRV and EDRV. The output timings of SYNC 2 and SYNC 3 are determined in accordance with the set values of preset counters 64 and 65 set by a signal 139 from a CPU bus 422. SYNC 2 and SYNC 3 initialize frequency dividers 66 and 67 and drive pulse generators 68 and 69. The pulse groups ODRV 118 and EDRV 119 are generated from CLK 0 outputted from the signal oscillator OSC 58' and frequency divided clocks all generated in synchro with each other. Therefore, the pulse groups are obtained as such signals as have no jitter to thus prevent signal disturbance due to interference among the signals.

The sensor drive pulses ODRV 118 all generated in synchro with each other are supplied to the first, third and fifth sensors, and the sensor drive pulses EDRV 119 are supplied to the second and fourth sensors. The sensors 58, 59, 60, 61 and 62 output video signals V1 to V5 independently and synchronously with the drive pulses, the video signals being amplified to a predetermined voltage value at independent respective amplifiers 501-1 to 501-5. The amplified video signals V1, V3 and V5 are inputted via a coaxial cable 101 to a video image processing circuit at the timings of OOS 29 shown in FIG. 2B, and the video signals V2 and V4 at the timings of EOS 134.

The color image signals read from an original divided into four sections and inputted to the video image processing circuit are separated into G, B and R colors at a sample/hold circuit S/H 502 and thereafter, the signals including 3×5=15 types of signals are processed at the next stage.

The sampled and held analog color image signals for each R, G and B color at the S/H circuit 502 are digitalized independently for each channel 1 to 5 at an A/D converter circuit and outputted in parallel therefrom as digital signals.

In the above embodiment, an original is read with five sensors disposed in a staggered pattern having five sections in the main scan direction and a distance of 62.5 microns×4=250 microns in the sub scan direction as described previously. Therefore, as shown in FIG. 2A, the readout positions of the previously scanning channels 2 and 4 differ from those of the other channels 1, 3 and 5. To correctly process signals from these sensors, memories corresponding in capacity to several lines are provided. The description of the method of controlling the memories is omitted because it is not the gist of this invention.

FIG. 4A is a detailed circuit diagram of a black correction circuit 506 shown in FIG. 1.

As shown in FIG. 4B, the black levels of channels 1 to 5 greatly vary with chips and pixels if the quantity of light is small. Such black levels cause the image data to have stripes and irregular portions. It is necessary therefore to compensate for such variation of the black level portion which is compensated by the circuit shown in FIG. 4A.

Prior to a copy operation, an original scan unit is moved to a black panel having a uniform density disposed at a non-image region of the front end portion of the original support plate. Then, a halogen lamp is illuminated to supply a black level image signal to the circuit. The black level signal is stored in RAM 78 by selecting A by a selector 82 (signal d), closing a gate 80 (signal a), and opening a gate 81. Namely, data lines 151, 152 and 153 are interconnected. A signal c is supplied to a selector 83 so as to supply, as an address input to RAM 78, the output from an address counter 84 which is initialized upon reception of an inverted signal of HSYNC. Therefore, the black level signal for one line is stored in RAM 78. The above operation is called a reference black level store mode.

In reading the image of an original, RAM 78 operates in a data readout mode. The black level signal is read for each pixel and for each line and supplied to B input of a subtracter 79 via data lines 153 to 157 by closing the gate 81 (signal b) and opening the gate 80 (signal a). Therefore, for example, in the case of a blue signal, Bin (i)−DK (i)=Bout (i) is outputted as the black correction circuit output 156, where DK (i) represents black level data. The above operation is called a black correction mode.

Similarly, green Gin and red Rin are processed by circuits 77G and 77R. The selector and gate control signals a, b, c and d are controlled by CPU 22 via a latch 85 functioning as an I/0 port.

Next, a white level correction (shading correction) will be described.

Figure 5A:
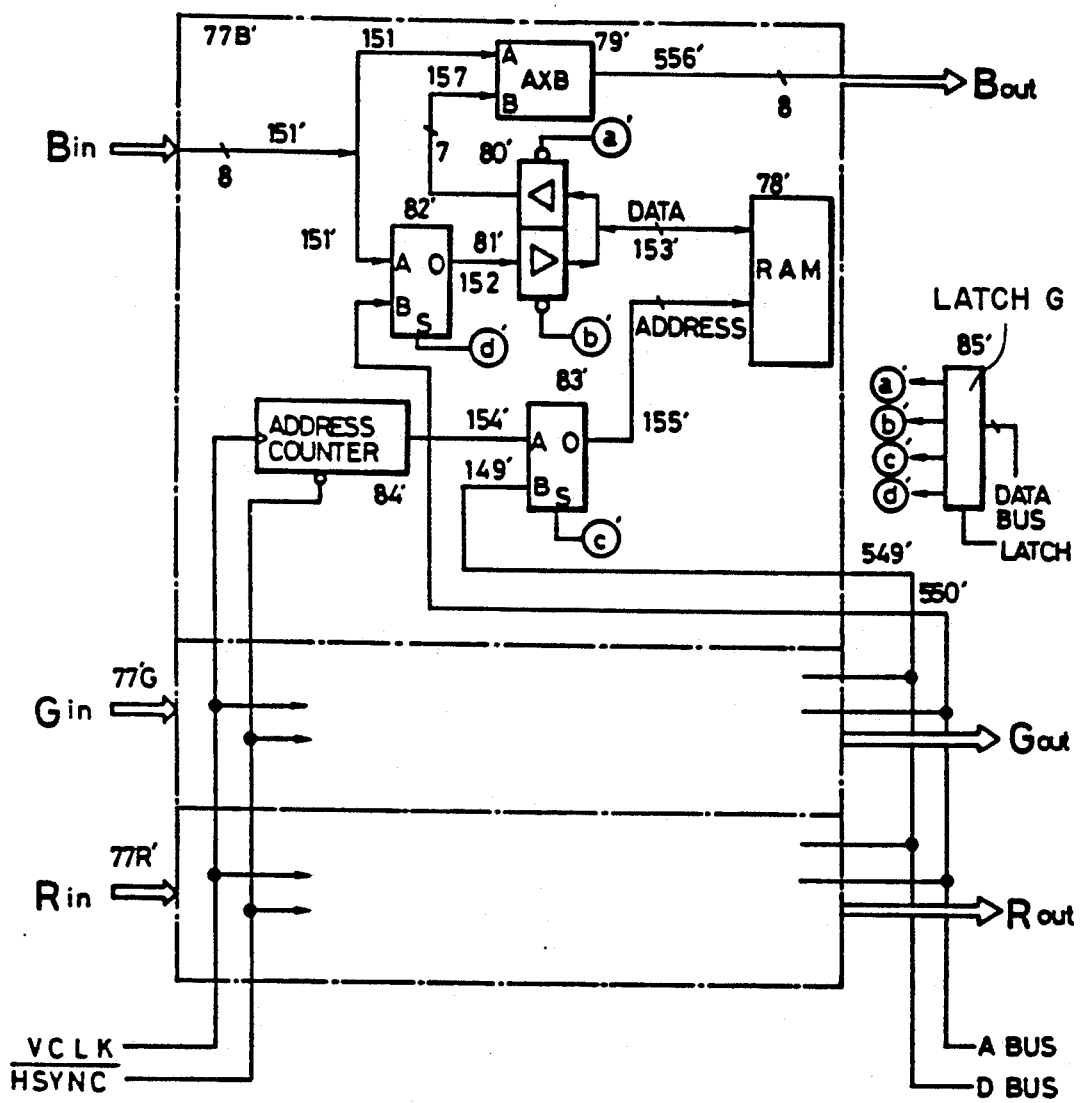
FIGS. 5A to 5D show a block diagram of a fundamental circuit for correcting a white level, and its explanatory views, respectively.

FIG. 5A is a block diagram showing the fundamental circuit for performing white level correction.

The circuit shown in FIG. 5A is basically the same as the circuit shown in FIG. 4A. The difference between the circuits is that the black correction is carried out by the subtracter 79, whereas the white correction is carried out by a multiplier 79'. The description of similar operation is omitted.

The white level correction is an operation for correcting variation of sensitivities of the illumination system, optical system and sensors, in accordance with white data obtained upon illumination of a white panel having a uniform density to which the original scan unit is moved.

Figure 5B:
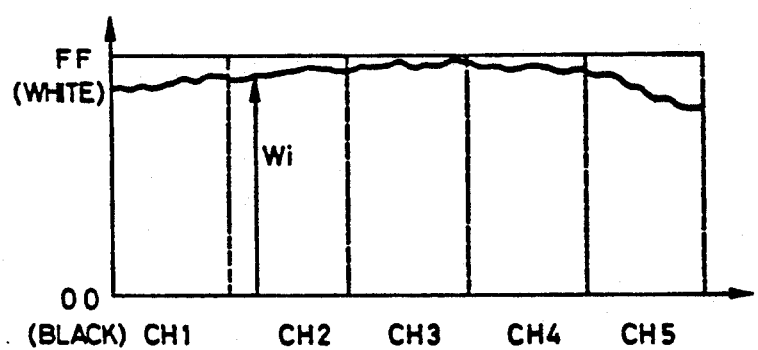
Figure 5C:
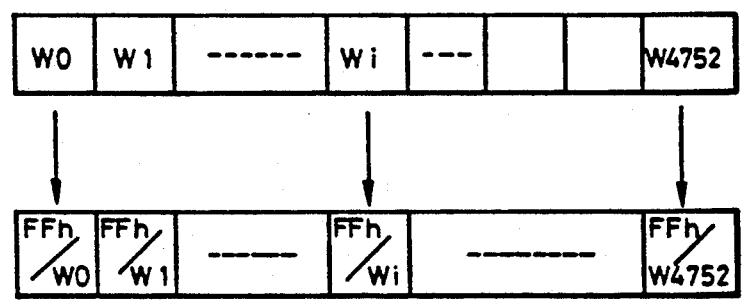

Prior to a copy operation or readout operation, when CCD 500 comes to a readout position (home position) for reading the white panel, an exposure lamp (not shown) is illuminated to store image data of one line having a uniform white level into RAM 78'. If the width corresponding to the A4 longer side is used in the main scan direction, it becomes necessary to use 4752 bytes as the capacity of RAM (for 16 pel/mm, 16×297 mm=4752 pixels). Assuming that white panel data for the i-th pixel is Wi (i=1 to 4752) as shown in FIG. 5B, white panel data for each pixel are stored in RAM 78' as shown in FIG. 5C.

The corrected data D0 becomes $Di \times FFH/Wi$ where Di represents readout data Di for the i-th pixel. In operation, using control signals a', b', c' and d' from a latch 85' under control of CPU, a gate 80' is closed and a gate 81' is opened so that selectors 82' and 83' select B to make CPU accessible to RAM 78'.

Figure 5D:
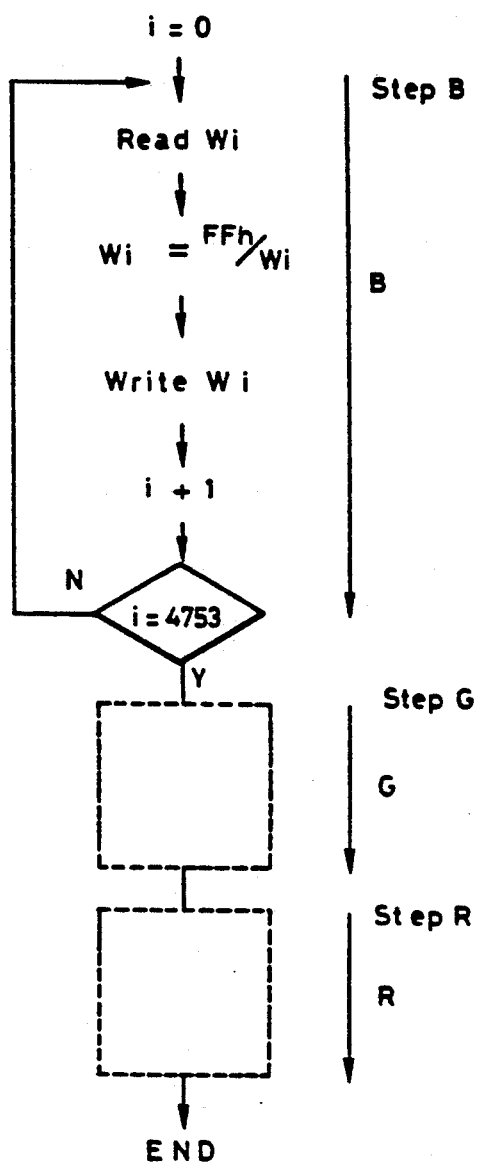

FFH/W0, FFH/W1, ... for the first, second, ... pixels are calculated for a blue component signal (step B in FIG. 5D), green component signal (Step G) and thereafter for a red component signal (step R). The corrected data $D0=Di\times FFH/Wi$ for an inputted original image data Di is obtained as in the following manner. The gate 80' is opened (control signal (a')) and the gate 81' is closed (b') so that the selector 83' selects A and the coefficient data FFH/Wi read from RAM 78' are sent to the multiplier 79' via the data lines 153 and 157 to multiply it by the original image data from the data line 151.

Variations of black and white levels are caused by various factors such as the black level sensitivity and CCD dark current of the image input system, sensitivities of the sensors, the quantity of light of the optical system, the white level sensitivity and the like. The color image data subjected to black and white level correction and having a uniform density throughout the length in the main scan direction and having color density proportional to the inputted light quantity are inputted to a logarithmic conversion circuit 508 (FIG. 1) after changing the data in accordance with the relative luminosity factor of human eyes.

Figure 6A:
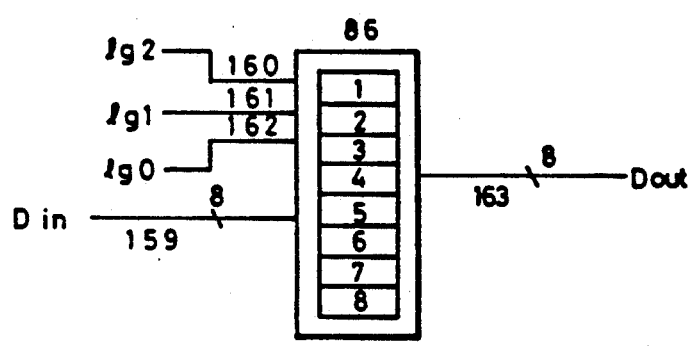
FIGS. 6A and 6B show a logarithmic conversion LUT of the embodiment, and a graph showing its characteristic, respectively.
Figure 6B:
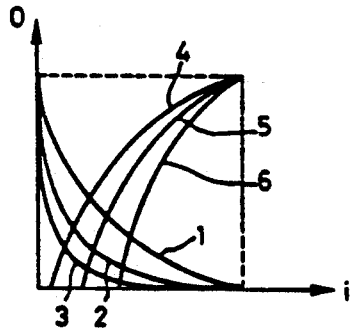

The color image data are converted such that a white color becomes 00 H and a black color FFH. The gamma characteristic differs depending upon the type of an image source read out with an image readout sensor. The image source includes an ordinary reflection type original, and a negative or positive transparent original used by a film projector or the like. In the latter case, the gamma characteristic also differs depending upon the sensitivity and exposure condition of a film. In consideration of various gamma characteristics, a plurality of logarithmic conversion look-up tables are provided and a suitable one is selectively used, as shown in FIGS. 6A and 6B. Such selection is effected using signals lg0, lg1 and lg2 on lines 160 to 162 which signals are selected via an I/O port (not shown) of CPU upon actuation of a console panel or the like.

The B, G and R data correspond to the density values of an image, and to the toner amounts of yellow (Y), magenta (M) and cyan (C). Therefore, the color image data will be described hereinafter while referring to Y, M and C.

A color conversion circuit 507 detects a specific color and replaces it with another color for the inputted color image data R, G and B 113, 114 and 115. For example, a red portion in the original is replaced with another optional color.

Figure 7:
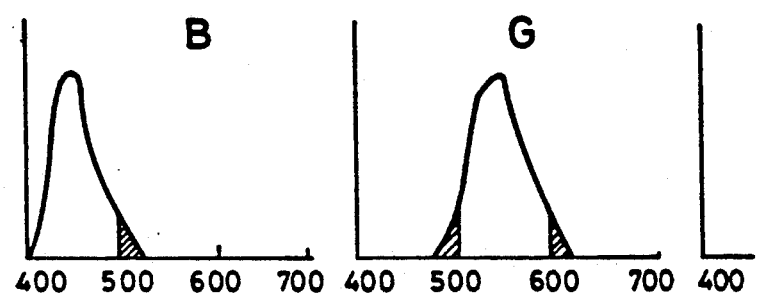
FIGS. 7 and 8 are graphs showing the characteristics of the embodiment.
Figure 8:
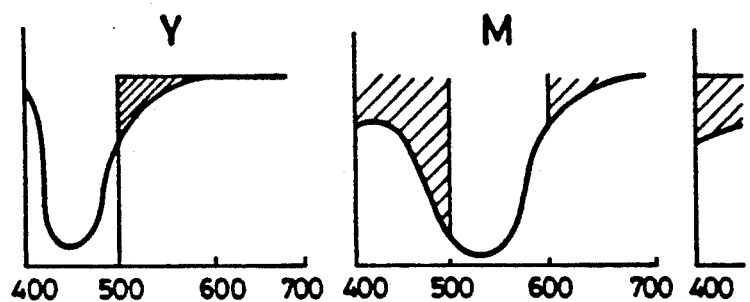

Next, the color component image data obtained through logarithmic conversion (i.e., yellow, magenta and cyan components) are subjected to color correction. The spectral characteristics of a color separation filter disposed in front of each pixel of the color readout sensor have unnecessary transparent regions indicated by oblique lines in FIG. 7. Also the color toner to be transferred to a transfer sheet has unnecessary absorption components as shown in FIG. 8.

Masking correction is well known in the art whereby the color component image data Yi, Mi and Ci are subjected to color correction using the following matrix.

$$\begin{vmatrix} Yo \\ Mo \\ Co \end{vmatrix} = \begin{vmatrix} aY1 & -bM1 & -Cc1 \\ -aY2 & bM2 & -Cc2 \\ -aY3 & -bM3 & Cc3 \end{vmatrix} \cdot \begin{vmatrix} Yi \\ Mi \\ Ci \end{vmatrix}$$

Black toner addition and under color removal (UCR) are also well known in the art. In the former case, the minimum values (Min (Yi, Mi, Ci)) of the color component image data Yi, Mi and Ci are calculated which are used to add black toner. In the latter case, the respective color toners are reduced in accordance with the added black toner.

Figures 2, 9A:
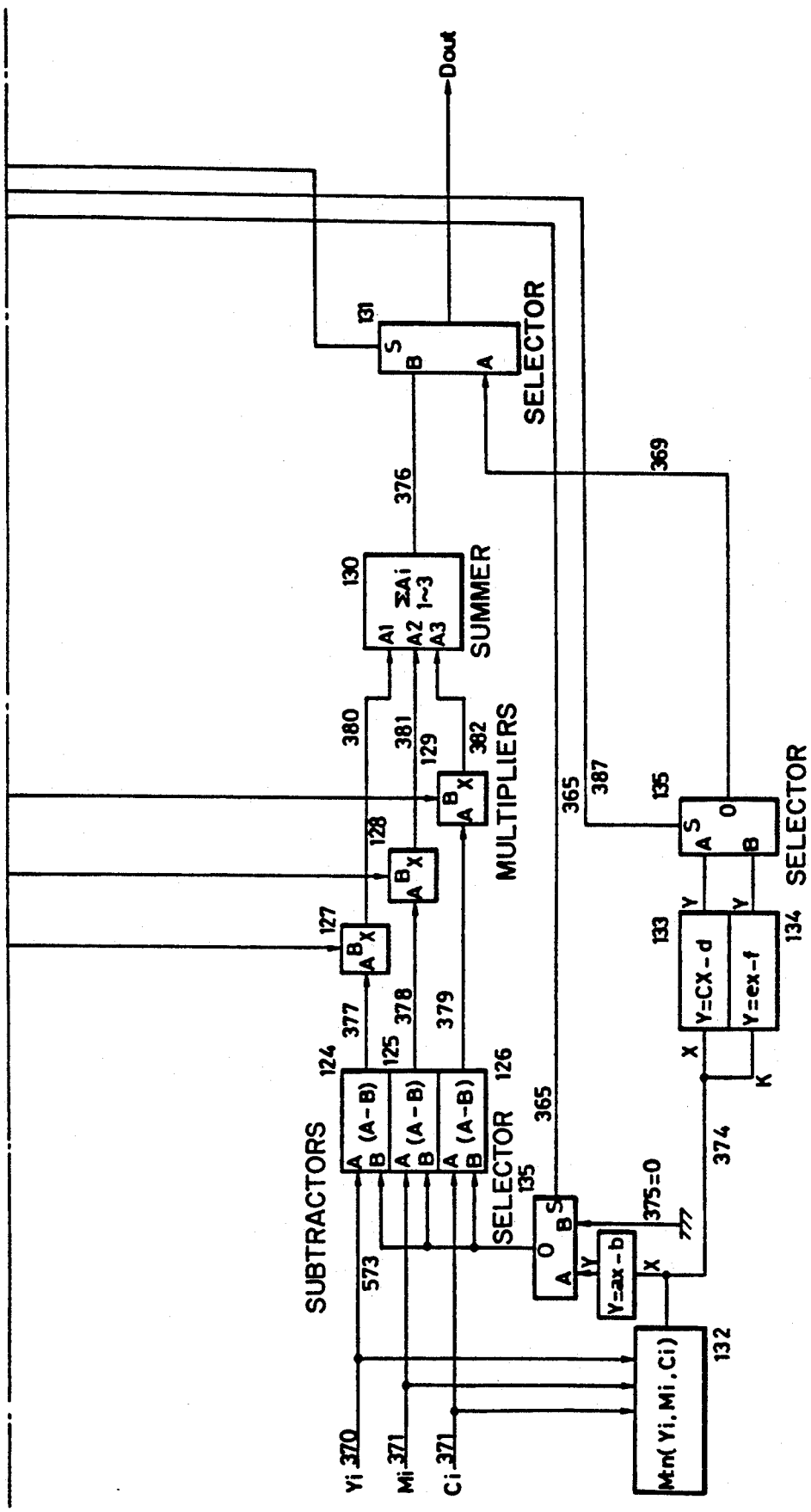

FIG. 9A is a block diagram of the circuit for performing masking, black toner addition and UCR.

The characteristic features of the circuits are the following three points.

(1) Two types of masking matrices are provided which are switched at high speed by 1/0 signals on a single signal line.
(2) The presence/absence of UCR is switched at high speed by 1/0 signals on a single signal line:
(3) Two types of circuits for determining the amount of black toner to be added are provided which are switched at high speed by 1/0 signals.

Prior to reading an image, CPU 22 selects a desired one of first and second matrix M1 and M2 via a bus. In this embodiment, $$M1 = \begin{vmatrix} aY1 & -bM1 & -Cc1 \\ -aY2 & bM2 & -Cc2 \\ -aY3 & -bM3 & Cc3 \end{vmatrix}$$

$$M2 = \begin{vmatrix} aY1 & -\beta M1 & -\gamma c1 \\ -aY2 & \beta M2 & -\gamma c2 \\ -aY3 & -\beta M3 & \gamma c3 \end{vmatrix}$$

The matrix M1 is set in registers 87 to 95, and the matrix M2 is set in registers 96 to 104. Selectors 111 to 122, 135 and 131 select A upon reception of "1" at its S terminal, and B upon reception of "0". Therefore, a switch signal MAREA 364 is set to "1" to select the matrix M1, and "0" to select the matrix M2. A sector 123 outputs signals a, b and c upon reception of selection signals C0 and C1 366 in accordance with the truth table shown in FIG. 9B. A color signal corrected as desired can be obtained by setting (C2, C1, C0) to (0, 0, 0), (0, 0, 1), (0, 1, 0), and (1, 0, 0) for Y, M, C, and Bk color signals, respectively, and (0, 1, 1) for a monochrome signal. When (C0, C1, C2) is (0, 0, 0) and MAREA is "1", then the contents (aY1, −bY1, −Cc1) of the registers 87, 88 and 89 are outputted as an output (a, b, c) of the selector 123.

A black component signal 374 calculated as Min (Yi, Mi, Ci)=k based upon the input signal Yi, Mi and Ci is subjected to primary conversion of Y=ax−b (where a and b are constants) and inputted to B terminals of subtracters 124, 125 and 126. At the subtracters 124 to 126, Y=Yi−(ak−b), M=Mi−(ak−b) and C=Ci−(ak−b) are calculated for under color removal which are inputted via signal lines 577, 578 and 579 to multipliers 127, 128 and 129 for masking operation. The selector 135 is controlled by signal UAREA 365 which can switch the presence/absence of UCR at high speed.

The multipliers 127, 128 and 129 are inputted at its A terminal with (aY1, −bM1, −Cc1), and at its B terminal with the above described [Yi−(ak−b), Mi−(ak−b), Ci−(ak−b)]=[Yi, Mi, Ci] so that as apparent from the figure, obtained as an output Dout is Yout=Yi×(aY1)+Mi×(−bM1)+Ci×(−Cc1) under the condition of C2=0 (selection of Y or M or C). Thus, an yellow image data subjected to masking and under color removal can be obtained. Similarly, $$Mout = Yi \times (-aY2) + Mi \times (bM2) + Ci \times (-Cc2)$$

$$Cout = Yi \times (-aY3) + Mi \times (-bM3) + Ci \times (Cc3)$$

are obtained as Dout. CPU 22 controls color selection in the output order by a color printer in accordance with the values (C0, C1, C2) shown in FIG. 9B. Registers 105 to 107, and 108 to 110 are used for generating a monochrome image by performing weighted addition for each color in accordance with MONO=k1Yi+l1Mi+m1Ci following the similar principle to that of masking color correction. Selection signals MAREA 364, UAREA 365 and KAREA 387 are used for switching the masking color correction matrices M1 and M2 at high speed. UAREA 365 switches at high speed the presence/absence of UCR. KAREA 387 is a primary conversion switch signal for a black component signal to be outputted from a signal line 369 to selector 131 as Dout. The primary conversion switch signal switches at high speed between Y=ck−d and Y=ek−f (where c, d, e and f are constant parameters) for K=Min(Yi, Mi, Ci). Thus, the masking coefficients, UCR quantities, black quantities can be changed for respective areas within a single copy image.

Therefore, the circuit can process a plurality of image input sources having different color separation characteristics or different black tones. The selection or area signals MAREA, UAREA and KAREA 364, 365 and 587 are generated by an area generator circuit shown in FIG. 1.

Figure 10:
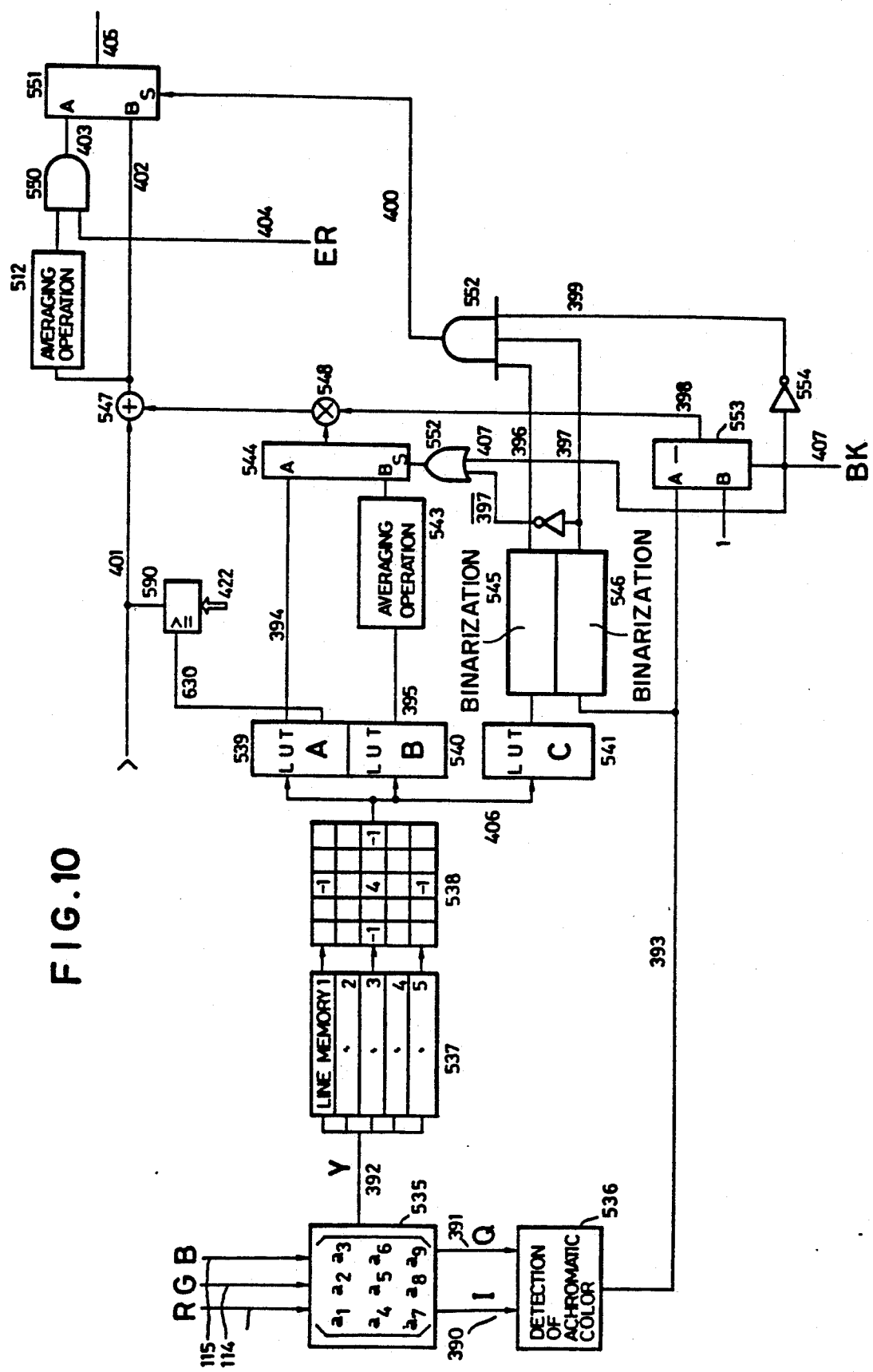
FIG. 10 is a block diagram of another embodiment of the color image processing apparatus according to the present invention.

Next, a circuit used with the above embodiment for improving the reproduction of black characters and fine lines in an original and for improving the color bleeding at the edge portions of black characters and fine lines will be described with reference to FIG. 10.

As described with reference to FIGS. 4 and 5, R, G and B color signals 113, 114 and 115 with their black and white level corrected are processed by the logarithmic conversion circuit 508 and the masking and under color removal circuit 509. The color signal to be supplied to the printer is selected and delivered to the signal line 401. In parallel with the above operation, the luminance signal Y and color difference signals I and Q are calculated at an Y, I and Q calculation circuit 535 in accordance with the signals R, G and B 113, 114 and 115, to detect the achromatic and edge portions of an original (namely black character and fine line portions). The luminance signal Y 392 of five lines is inputted to a line buffer circuit 537 in order to perform 5×5 matrix operation at a known digital secondary differenciation circuit 538 for detection of edge signals through Laplacian operation by the circuit 538.

Figure 11A:
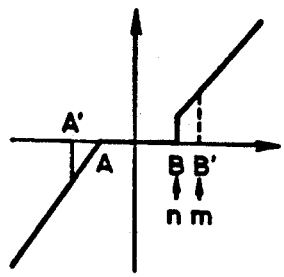
FIGS. 11A to 11D show the characteristics of a look-up table of the embodiment shown in FIG. 10.
Figure 11B:
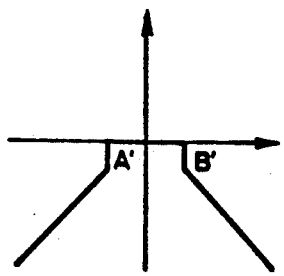
Figure 11C:
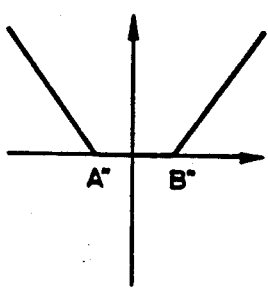
Figure 11D:
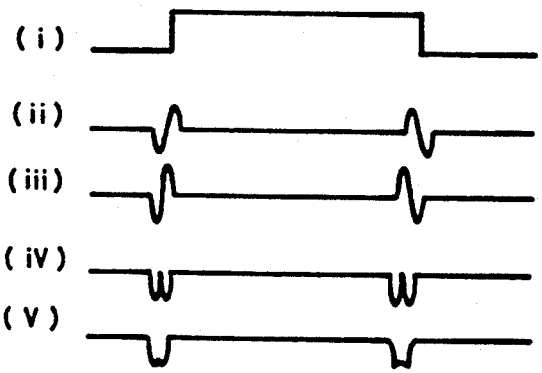

Specifically, if the inputted luminance signal Y is a step input (e.g., character portion) indicated at (i), in FIG. 11D, then an output 406 after Laplacian operation becomes a signal indicated at (ii) FIG. 11D. Such an output will be called an edge signal hereinafter. Lookup tables LUT A 539 and LUT B 540 having the characteristics shown in FIGS. 11A and 11B determine the quantity (e.g., toner quantity) at the edge portion of a black character (or black fine line).

If LUT A 539 is used, the edge signal 406 becomes to have a large amplitude indicated at (iii) in FIG. 11D which determines the black toner quantity at the black edge portion as will be described later. Alternatively, if LUT B 540 is used, the edge signal 406 becomes to have a negative value indicated at (iv) in FIG. 11D which determines the Y, M and C toner quantities at the edge portion. This signal is passed to a smoothing or averaging circuit 543 to obtain a signal indicated at (v) in FIG. 11D.

Figure 12:
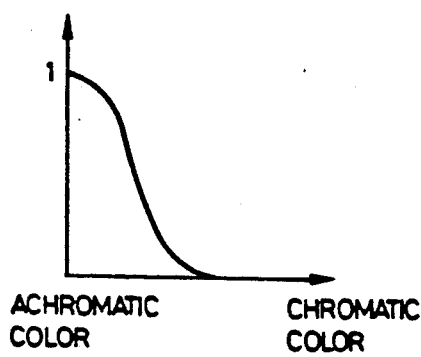
FIG. 12 is an explanatory graph of the embodiment shown in FIG. 10.

An achromatic color detection circuit 536 outputs, e.g., "1" for a completely achromatic color, and "0" for a chromatic color, and has the characteristic shown in FIG. 12 by way of example. The output from the circuit 536 is selected by a selector 553 when a black color is to be printed, upon reception by the selector 553 of a signal 407 of "1" representative of black toner print. The signal 398 thus selected by the selector 553 is supplied to a multiplier 548 to be multiplied by a signal 394 (indicated at (iii) in FIG. 11D) determining the black toner quantity. The multiplied signal is added to the original image signal at an adder 547.

On the other hand, during the Y, M or C toner print, it is desirable not to print Y, M or C toner on a black character and fine line. Therefore, the selector 553 selects "1" based on the color selection signal 407. The signal "1" is supplied to the multiplier to be multiplied by an smoothed or averaged signal of an output from OUT B 540 via a selector 544, so that the adder 547 is supplied with a signal similar to that indicated at (v) in FIG. 11D and only the black edge portion is reduced in amplitude of the original signal. This means that the signal determining the black toner quantity at the black edge portion has a large amplitude, i.e., the black toner quantity is increased at the edge portion and the Y, M and C toner quantity is reduced to thus make the black portion to be sensed more black. A signal 397 obtained by binarizing the achromatic signal 393 at a binarization circuit 546 becomes "1" for an achromatic color and "0" for a chromatic color.

Specifically, in the case of black toner print (signal 407 is "1"), the selector 544 is inputted at its S terminal with "1" so that A input (signal indicated by (iii) in FIG. 11D) is outputted therefrom to emphasize the black edge. In the case of Y, M or C toner print (signal 407 is "0"), the signal 397 becomes "1" so that for the achromatic color the B input which is an averaged signal of an output from LUT B is selected to reduce the Y, M or C toner quantity, with the signal indicated at (v) in FIG. 11D being supplied to the adder 547. For the chromatic color the signal 397 becomes "0" (the inverted signal 397 is "1") so that the selector 544 is supplied with its S terminal with "1" and the A input is selected, with the signal indicated at (iii) in FIG. 11D being supplied to the adder 547 to emphasize the edge portion well known in an ordinary case.

LUT A 539 has two LUTs which take a value of 0 when the edge signal is smaller than plus/minus n and m, respectively, as shown in FIG. 11A. The two LUTs are selected in accordance with an output from a comparator 590 whose output varies with the level (density of an original) of the original signal 401. If the original density is larger than a value set by CPU 22 at the comparator 490 via the bus 422 (if the comparator 590 outputs "1"), LUT is selected whose output is clamped to 0 at A' and B' as shown in FIG. 11A. If the original density is smaller than the set value ' (if the comparator 590 outputs "0"), LUT is selected whose output is clamped to 0 at A and B. With such a circuit arrangement, it becomes possible to change the noise elimination effects in accordance with the density.

An output 400 from an AND gate 552 is used to further improve the edge portion of a black character. In accordance with the output 400, a signal 403 (A input) is selected for Y, M or C print at the edge portion of a black character, and a signal 402 (B input) is selected for the other case. A signal 396 inputted to the AND gate 552 is a binarized signal binarized at a binarizing circuit 545 of an output from LUT C 541 which gives the edge signal the characteristic shown in FIG. 11C. The signal 396 takes a value of "1" when the absolute value of the edge signal is larger than or equal to a predetermined value, and a value of "0" when the absolute value is smaller than that.

Therefore, the signal 396 of "1", 397 of "1" and 399 of "L" occur only when the edge signal for an achromatic color has a large amplitude (the edge portion of a black signal is printed and the Y, M or C toner is used). In this case, only for the portion corresponding to the black edge, the original signal is subtracted by the signal determining the Y, M or C toner quantity. The resultant signal is smoothed or averaged at an averaging circuit 512 and selected by the selector 551 when a signal ER is "1", to then outputted as the signal 405. In the other cases, an ordinarily edge emphasized signal 402 is outputted as the signal 405. The signal ER is controlled by CPU (not shown) such that the output from the averaging circuit 512 is outputted as the signal 405 when ER takes a value of "1", and "0" is outputted as the signal 405 when ER takes a value of "0". Consequently, the Y, M or C toner signal at the edge portion of a black character may be made completely 0 to further eliminate color bleeding.

FIG. 13 illustrates the timings of generating the area signals described previously which include MAREA 564, UAREA 565 and KAREA 587.

Figure 13A:
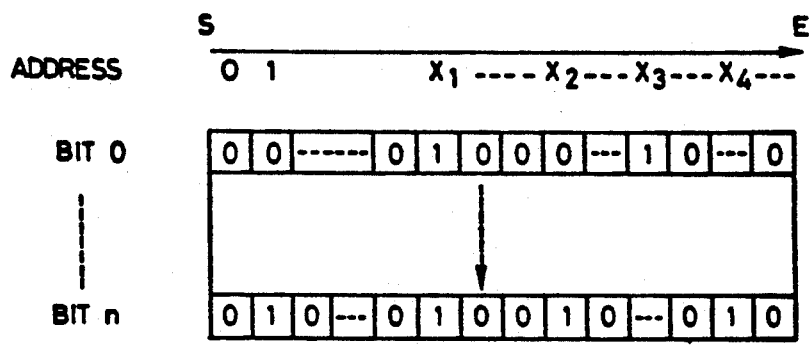
FIGS. 13A to 13F illustrate the arrangement for obtaining a generated position and the like of an area signal.
Figure 13B:
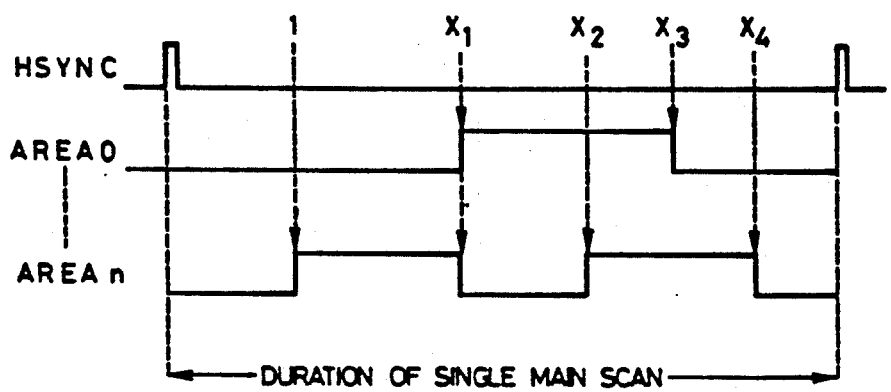
Figure 13C:
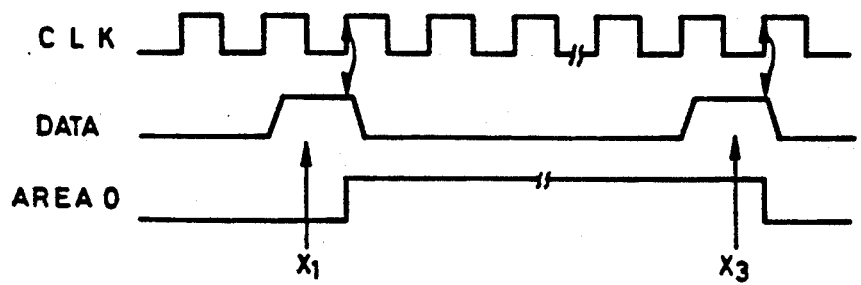
Figure 13D:
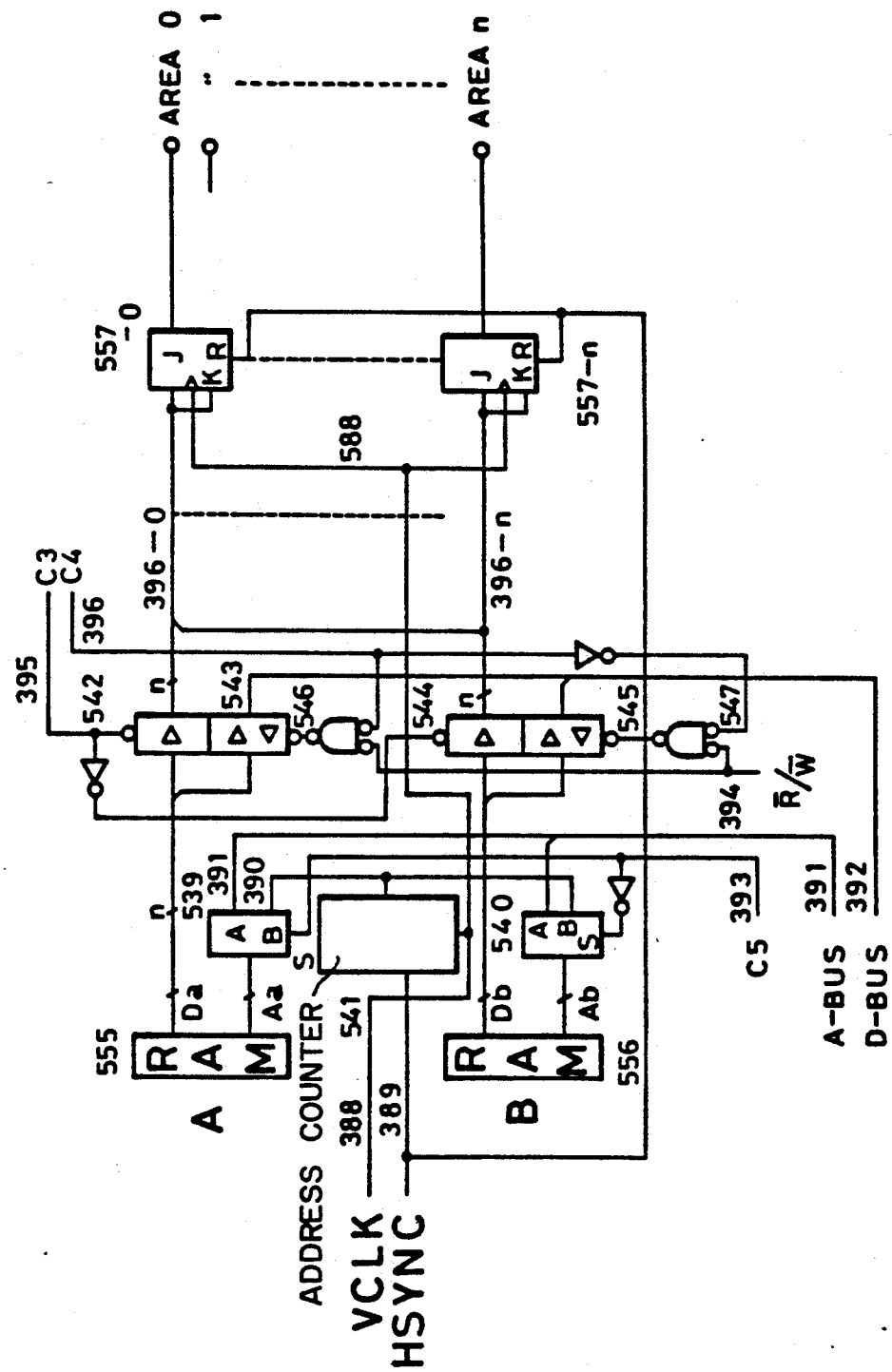
Figure 13E:
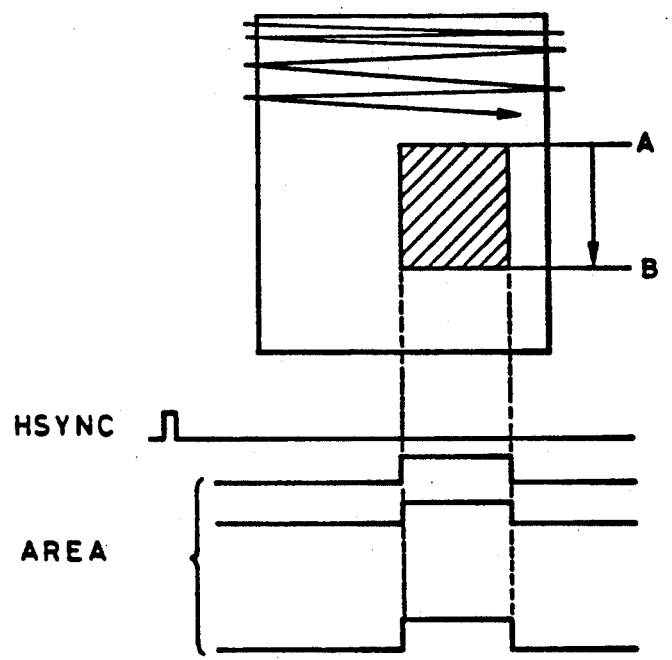

An area means, for example, the portion indicated by oblique lines in FIG. 13E. This area is designated by a digitizer (not shown) or the like which obtains such signals as indicated at AREA 0 in FIG. 13C by scanning each line (upon each HSYNC) in the sub scan direction.

FIGS. 13A to 13D are views illustrating how CPU 22 programmably controls the position, duration and number of durations of the area signals.

In the above arrangement, a single area signal is represented by a set of bits in RAM accessible by CPU. For example, in order to obtain n area signals AREA 0 to AREA n, two RAMs 555 and 556 shown in FIG. 13 each constructed of n sets of bits are provided. In order to obtain area signals AREA 0 and AREA n shown in FIG. 13B, "1" is set to the bit 0 at the addresses x1 and x3 of RAM, and "0" is set to the bit 0 at the remaining addresses, whereas "1" is set to the bit n at the addresses 1, x1, x2 and x4 of RAM, and "0" is set to the bit n at the remaining addresses. Data in RAM are sequentially read in synchro with a predetermined clock CLK using HSYNC as a reference. For example, as shown in FIG. 13C, data "1" are read at the addresses x1 and x3.

The read-out data are applied to both the J and K terminals of J-K flip-flops 557-0 to 557-n shown in FIG. 13D so that the applied data are toggled (e.g., upon output of a CLK when "1" is read from RAM, the output of the flip-flop changes from "0" to "1" and from "1" to "0"). Thus, an area signal such as AREA 0 shown in FIG. 13C is outputted. An area signal is not outputted if the read-out data are "0" at all the addresses so that there is no designation of an area.

FIG. 13D is a block diagram of the circuit for performing the above operation. The above-described two RAMs 555 and 556 are used for the reason that data read and write can be carried out at high speed by switching the two RAMs. For example, while data are sequentially read for each line from RAM A 555, CPU 22 controls RAM B 556 to write data of the area signals.

Figure 13F:
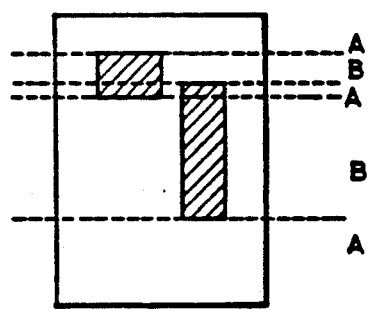

Therefore, as exemplarily shown in FIG. 13F, in order to designate two areas, RAM A and RAM B are switched at the timings A, B, A, B, A in this order. Referring to FIG. 13D, with (C3, C4, C5) being set at (0, 1, 0), an address which is an output from a counter 541 counting clocks VCLK is supplied via a selector 539 to RAM A 555 on a signal line Aa. By opening a gate 542 and closing a gate 544, the data are read from RAM A555 and outputted to the J-K flip-flops 557-0 to 557-n to output area signals AREA 0 to AREA n.

CPU controls to write data into RAM B 556 using an address bus A-Bus, data bus D-Bus and inverted read-/write (R/W).

Contrary to the above, in order to output area signals by reading data from RAM B 556, (C3, C4, C5) are set at (1, 0, 1) so that CPU can control to write data into RAM A 555. C3, C4 and C5 are called an AREA control signal (ARCNT) which is supplied from an I/O port of CPU.

In accordance with the area signals, an image cutting operation (trimming), frame removal operation and the like can be readily performed. Specifically, referring to FIG. 1, an area signal 406 from an area generator 525 is selected by a selector 512 upon reception of an area switching signal ECH 423 outputted from an I/O port 25, and is supplied to an AND gate 513. This area signal takes a high level at the area position to be selected. For example, if a signal 406 like AREA 0 shown in FIG. 13B is used, the image from x1 to x3 is cut out, and if a signal like AREA n is used, the portion from x1 to x2 is trimmed and the portions from 1 to x1 and from x2 to x4 are cut out.

Figure 14A:
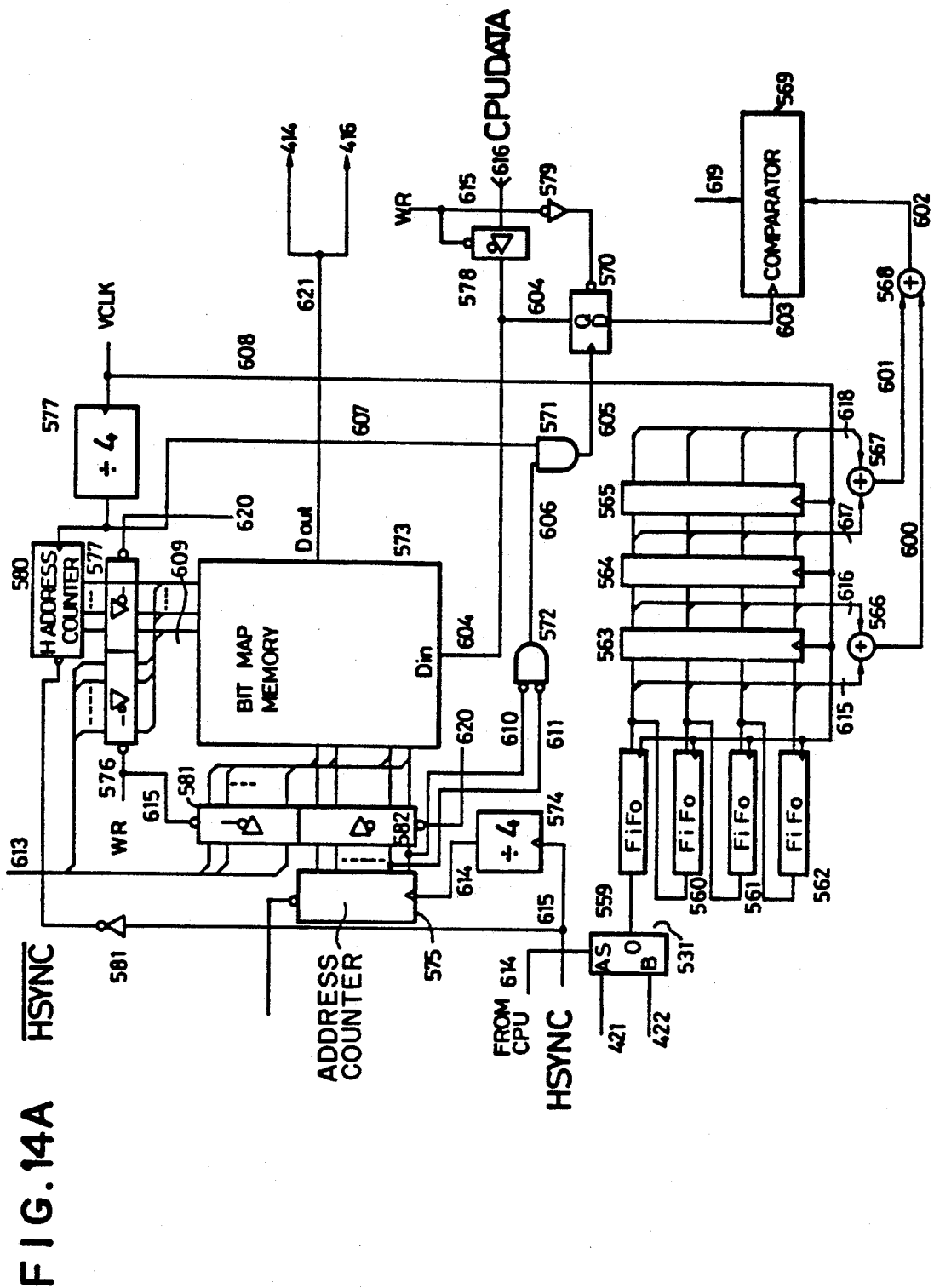
Figure 15:
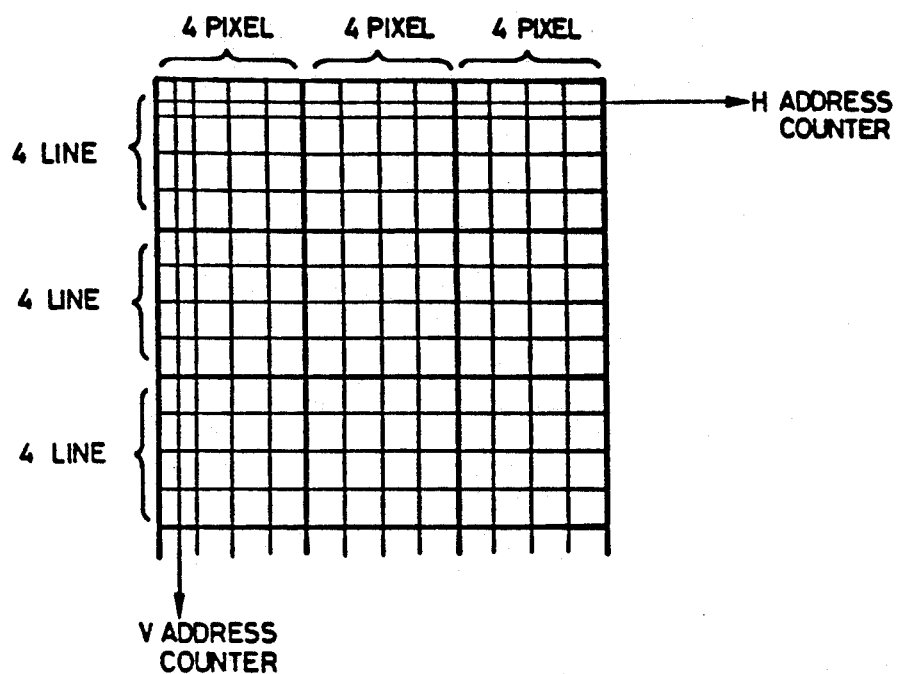
FIG. 15 is an explanatory view of the embodiment shown in FIG. 10.

FIGS. 14 and 15 show the area limit masking bit map memory used with this embodiment and its control timings.

As understood from FIG. 1, an area limit mask which limits only a specific color area within an original can be formed by using a detection output 422 from the color conversion circuit 507. An area limit mask which limits a specific density value (or signal level) area can be formed by using a binarized signal 421 binarized at a binarizing circuit 532 of a video image signal inputted via a gate 533 from the external circuit.

FIG. 14A is a detailed block diagram showing the area limit masking bit map memory 573 shown in FIG. 1 and its peripheral circuits.

A masking memory 573 is constructed of blocks each having 4×4 pixels as shown in FIG. 15, each block corresponding to one bit of the bit map memory. For example, for an image of 16 pel/mm pixel density, the masking memory 573 may be constructed of (297×420×16×16), i.e., approximately 2M bits (e.g., two 1M bit dynamic RAM chips) for an 297×420 mm (A3 size) original.

Referring to FIG. 14A, signals 421 and 422 supplied to a selector 531 are used for forming a mask. Upon selection of the signal 421 from the binarizing circuit 532 shown in FIG. 1 when a selection signal 614 is supplied from CPU, the signal 421 is supplied to FIFO buffers 559 to 562 corresponding in capacity to 1×4 lines in order to count the number of "1s" in a 4×4 block. The output of FIFO 559 is coupled to the input of FIFO 560, and the output from FIFO 560 is coupled to the input of FIFO 561 and so on. The four outputs of FIFOs are latched at latches 563 to 565 in parallel in synchro with VCLK clocks (refer to the timing chart of FIG. 14D). The outputs 615 are added to the outputs 616, 617 and 618 from the latch 563, 564 and 565 at adders 566, 567 and 568, respectively. The added signals are compared with the value (e.g., 12) set by CPU 22 via the I/O port 25 at a comparator 569.

With the above circuit arrangement, it is judged whether or not the number of "1s" within a 4×4 block is larger than the set value (e.g., 12). In the example shown in FIG. 14D, the number of "1b 52697091.001 s" within a block N is 14, and that within a block (N+1) is 4. Therefore, the output 603 from the comparator 569 becomes "1" if the added signal 602 is 14, and "0" if the added signal 602 is 4. The output from the comparator is latched by a latch 570 once for each 4×4 block at the rising edge of a latch pulse 605. The Q output from the latch 570 is used as a Din input (mask forming data) to the bit map memory 573.

An H address counter 580 generates an address of the bit map memory in the main scan direction and is counted up by a clock obtained by frequency dividing VCLK clocks 608 by one fourth at a frequency divider 577. One address is assigned to one 4×4 block. Similarly, a V address counter 575 generates an address of the bit map memory in the sub scan direction and is counted up by a clock obtained by frequency dividing line synchro signals HSYNC by one fourth at a frequency divider 581. The count operation of the H and V address counters are controlled to be in synchro with the count operation (addition operation) of "1s" within the 4×4 block. The lower two bits 610 and 611 of the V address counter are NOR-ed by a NOR gate 572 to generate a signal 606 for gating the one fourth frequency divided clock 607 (refer to the timing chart shown in FIG. 14C). A latch signal 605 is generated based upon the signal 606 and the clock 607 from the frequency divider 577 so as to latch once for each 4×4 block.

A data bus 616 from and to CPU is included in CPU bus 422 (FIG. 1). An address bus is represented by reference numeral 613. A signal 615 from CPU 22 is a write pulse WR. During a write operation to the memory 573 from CPU, the write pulse becomes low level to open gates 578, 576 and 581 and connect the address bus and data bus from CPU to the memory 573, so that data are written at random into the memory 573. During the sequential read/write operation using the H and V address counters, a control line 620 for controlling gates 577 and 582 among lines connected to the I/O port 25 is used to open the gates 577 and 582 and supply sequential addresses to the memory 573.

Figure 16:
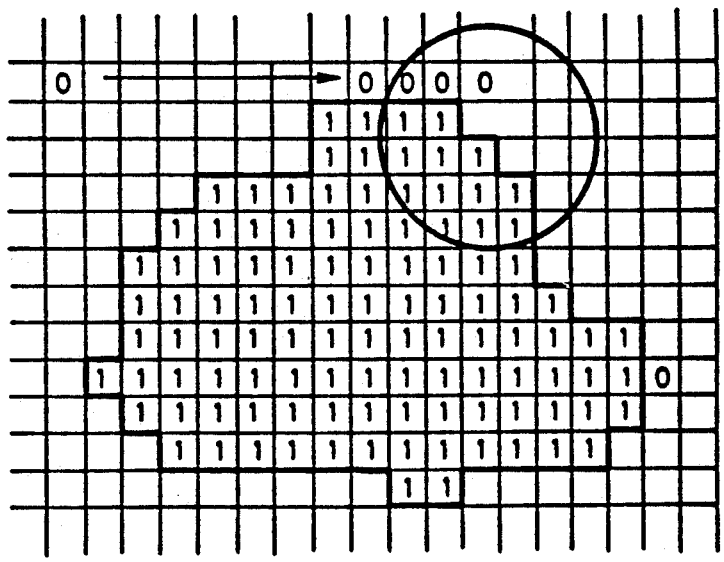
FIG. 16 shows a mask in the embodiment shown in FIG. 10.

For example, if a mask shown in FIG. 16 is formed using the signal 421 from the binarizing circuit 532, signal 422 from the color conversion circuit, or signal from CPU 22, then an image cutting operation, synthesizing operation or the like can be carried out with respect to the area within the broad line frame.

Figure 17A:
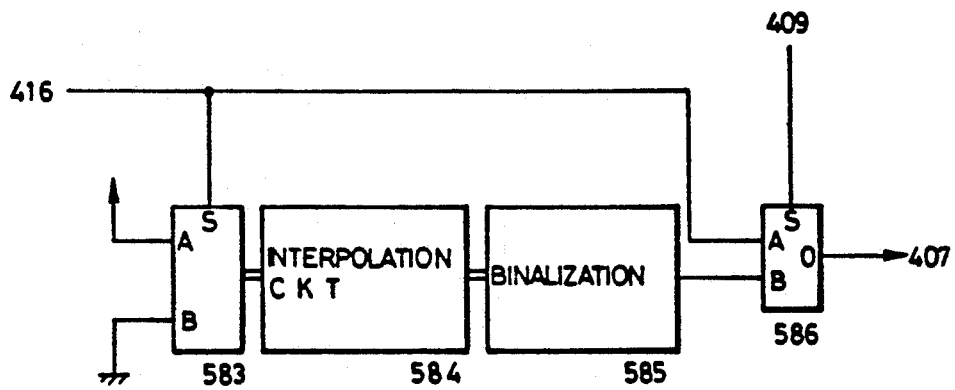
FIGS. 17A, 17B(i) and 17B(ii) show a block diagram of an interpolation circuit, and its explanatory view, respectively.
Figure 17B:
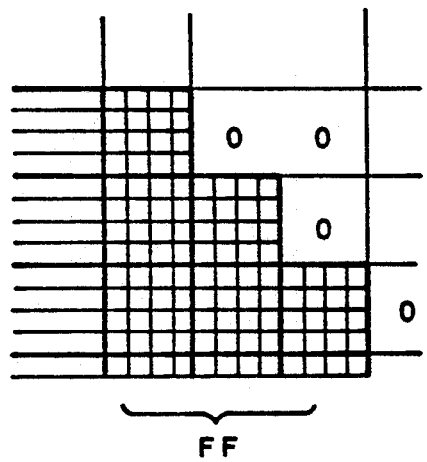
Figure 17B:
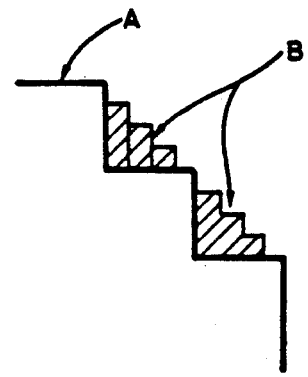

Next, the edge portion (boundary portion) of a mask formed in units of 4×4 pixel blocks is stepwise in 4 pixel units as indicated by a solid line at (ii) of FIG. 17B. Such a stepwise portion is smoothed by an interpolation circuit 526 shown in FIG. 1 to allow an even line as seen by human eyes.

FIG. 17A is a block diagram showing the interpolation circuit.

A selector 583 is supplied at its A input with a high clamp Hi (i.e.. 8 bit FFH). and at its B input with a ground potential i.e., 00 H). One of the inputs is selected in accordance with an output 416 from the bit map memory. Therefore, FFH is sent to an interpolation circuit 584 within an area mask, and 00 H outside the area mask, which are indicated at (i) of FIG. 17B. The interpolation circuit 584 may use a primary interpolation, higher order interpolation, sinc interpolation method or the like method, with a well known circuit arrangement being applied. An output from the interpolation circuit is a multi-value output which is binarized at a binarizing circuit 585. Thus, as indicated at (ii) of FIG. 17B, the original boundary A is made smooth to have a boundary B.

Figure 18A:
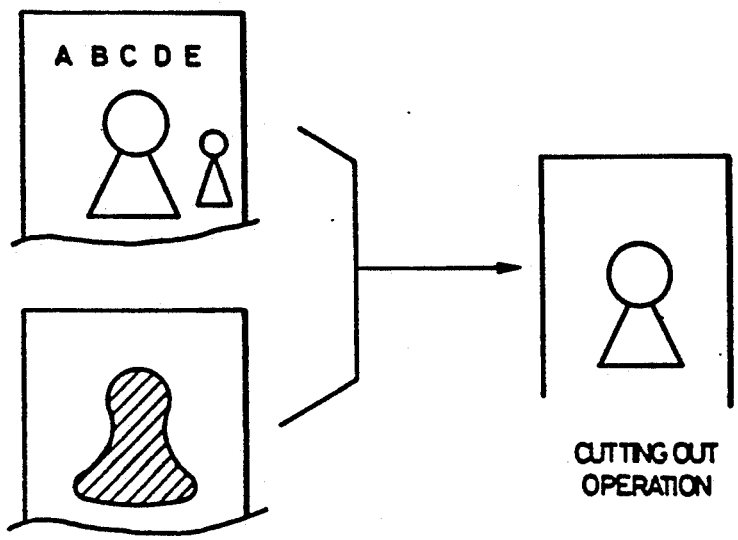
FIGS. 18A and 18B and FIG. 19 are explanatory views of the embodiment shown in FIG. 10.
Figure 18B:
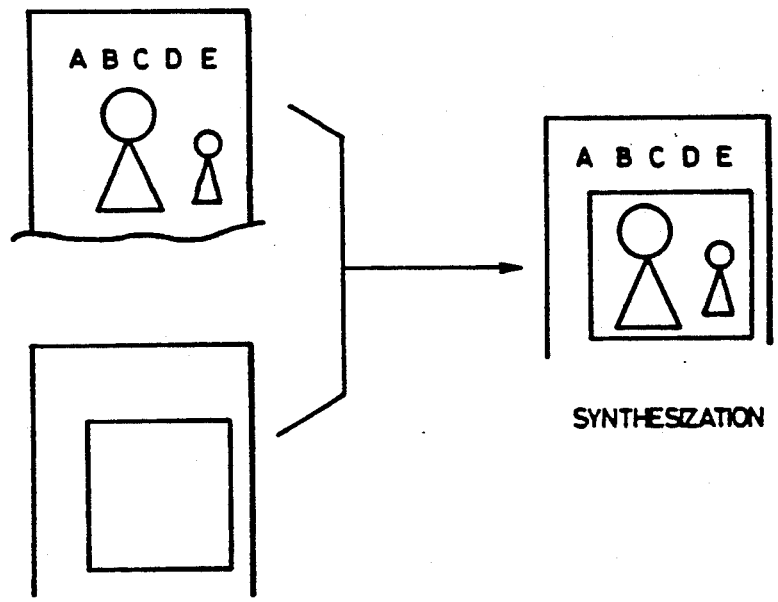

A selector 586 selects either the mask memory output per se (A), or the smoothed boundary. Such selection is effected by a selection signal 409 supplied from an I/O port of CPU 22. For example, if the interpolation output is selected by the signal 409 and an area limit mask is outputted from a selector 512 shown in FIG. 1 upon ECH signal, it becomes possible to cut out the non-rectangular image shown in FIG. 18A. If the output from the bit map memory is delivered onto a signal line 414 shown in FIG. 1 and synthesized at a synthesizing circuit to be described later, then an image shown in FIG. 18B is obtained.

Figure 19:
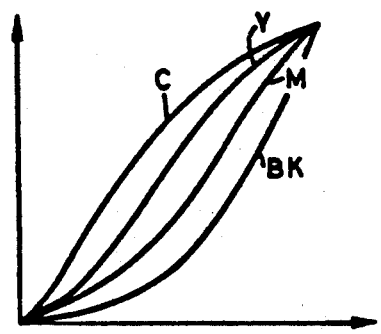
Figure 20A:
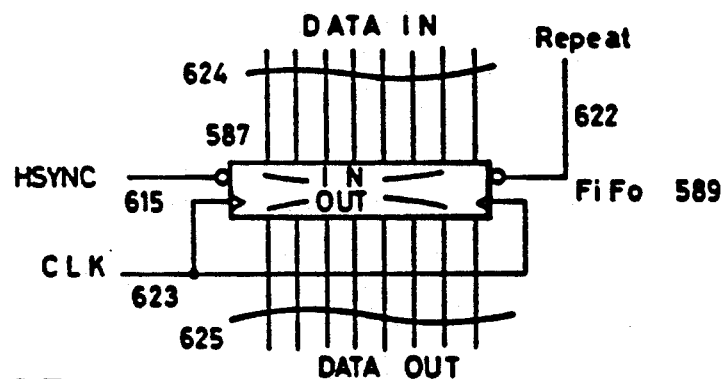
FIGS. 20A to 20C are explanatory views of a FIFO.

A density conversion circuit 514 shown in FIG. 1 operates to change the density and gradation for each color as shown in FIG. 19, and is constructed of a lookup table or the like. A repeat circuit 588 is constructed of a FIFO as shown in FIG. 20. HSYNC 615 of a low level pulse is inputted to FIFO once for each line as the line synchro signal to thus initialize an internal pointer WR (not shown). Reference numeral 624 represents input image data, and 625 output image data. A repeat signal is used for initializing the read pointer RD of FIFO.

Figure 20B:
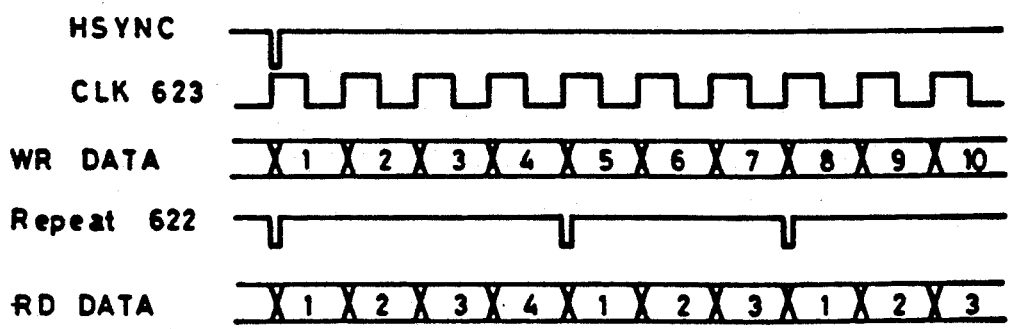
Figure 20C:
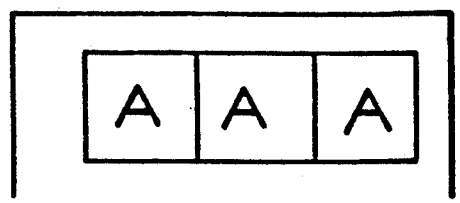

As shown in the timing chart of FIG. 20B, data 1 to 10 sequentially written in FIFO are read out repeatedly as 1, 2, 3, 4, 1, 2, 3, 1, 2, 3 each time REPEAT signal 622 is supplied. Therefore, the same image can be formed repeatedly as shown in FIG. 20C by supplying the repeat signal 622 to FIFO. Thus, by writing data "1"

within the area in the oblique line portion shown in FIG. 21A in the mask forming bit map memory, and synthesizing at a synthesizing circuit 516 shown in FIG. 1 during reading the data, dotted lines (cut-out lines) can be generated. Further, if the area generator 525 is controlled to generate the repeat signal at the timings (1) and (2) shown in FIG. 21A, cutout lines between repeated images can be generated. Furthermore, by writing data "1" within the area in the oblique line portion shown in FIG. 21B into the mask forming bit map memory, ruled lines can be synthesized. Still further, by writing data within the area in the oblique line portion, a black frame for an image can be generated.

According to the present invention, it is advantageous in that the half tone area can be processed at high degradation, and black characters and fine lines can be outputted as more black at high gradation, with less color bleeding.

What is claimed is:

1. An image processing apparatus comprising:
   repeating means for repeatedly outputting an input color image signal;
   generating means for generating an area signal; and
   synthesizing means for synthesizing an output of said repeating means and the area signal generated by said generating means.

2. An image processing apparatus according to claim 1, further comprising input means for inputting an image signal from an external source, and wherein said synthesizing means further synthesizes the image signal input by said input means with an output of said repeating means and the area signal generated by said generating means.

3. An image processing apparatus according to claim 1, wherein said generating means includes a bit map memory.

4. An image processing apparatus according to claim 1, wherein said repeating means includes a FIFO memory.

5. An image processing apparatus according to claim 1, wherein said synthesizing means performs a cutting-out operation according to the area signal.

6. An image processing apparatus according to claim 1, further comprising image signal generating means for generating said color image signal by reading an object image.

7. An image processing apparatus according to claim 1, wherein said generating means includes means for inputting an image signal from an external source.

8. An image processing apparatus comprising:
   first processing means for black-character processing an input color image signal; and
   second processing means for performing an editing process on a color image signal processed by said first processing means.

9. An image processing apparatus according to claim 8, wherein said editing process is a synthesizing process for synthesizing said color image signal processed by said first processing means and another image.

10. An image processing apparatus according to claim 8, wherein said editing process is a repeating process.

11. An image processing apparatus according to claim 8, wherein said first processing means includes:
    detecting means for detecting a black character of the input color image signal; and
    suppression means for suppressing a chromatic color signal of the black character detected by said detecting means.

12. An image processing method comprising:
    repeatedly outputting an input color image signal;
    generating an area signal; and
    synthesizing an output of the repeatedly output input color image signal and the generated area signal.

13. An image processing method according to claim 12, wherein the synthesizing step, a cutting-out operation is performed according to the area signal.

14. An image processing method according to claim 12, further comprising the step of generating a color image signal by reading an object image.

15. An image processing method comprising:
    a first processing step for black-character processing an input color image signal; and
    a second processing step for performing an editing process on a color image signal processed in said first processing step.

16. An image processing method according to claim 15, wherein the editing process is a synthesizing process of synthesizing the color image signal processed in the first processing step and another image.

17. An image processing method according to claim 15, wherein the editing process is a repeating process.

18. An image processing method according to claim 15, wherein the first processing step includes:
    detecting a black character of the input color image signal; and
    suppressing a chromatic color signal of the black character detected in the detecting step.

* * * * *

UNITED STATES PATENT AND TRADEMARK OFFICE
CERTIFICATE OF CORRECTION

PATENT NO. : 5,270,807
DATED : December 14, 1993
INVENTOR(S) : YOSHINORI IKEDA ET AL.

It is certified that error appears in the above-identified patent and that said Letters Patent is hereby corrected as shown below:

COLUMN 2

Line 29, "9A2, 9A2" should read --9A1, 9A2--.

COLUMN 3

Line 62, "OOS 29" should read --OOS 129--.

COLUMN 7

Line 25, "an" should read --a--.

COLUMN 8

Line 4, "an" should read --a--.
Line 49, "an" (first occurrence) should read --a--.

COLUMN 9

Line 48, "then" should read --then be--.

UNITED STATES PATENT AND TRADEMARK OFFICE
CERTIFICATE OF CORRECTION

PATENT NO.  : 5,270,807
DATED       : December 14, 1993
INVENTOR(S) : YOSHINORI IKEDA ET AL.

It is certified that error appears in the above-identified patent and that said Letters Patent is hereby corrected as shown below:

<u>COLUMN 11</u>

Line 15, "an" should read --a--.
   Line 37, "1b 52697091.001 s" should read -- "1s"--.

Signed and Sealed this

Twentieth Day of September, 1994

BRUCE LEHMAN

*Attest:*

*Attesting Officer*    Commissioner of Patents and Trademarks